US007595487B2

(12) United States Patent
Fedorov

(10) Patent No.: US 7,595,487 B2
(45) Date of Patent: Sep. 29, 2009

(54) CONFINING/FOCUSING VORTEX FLOW TRANSMISSION STRUCTURE, MASS SPECTROMETRY SYSTEMS, AND METHODS OF TRANSMITTING PARTICLES, DROPLETS, AND IONS

(75) Inventor: Andrei G. Fedorov, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 195 days.

(21) Appl. No.: 11/895,532

(22) Filed: Aug. 24, 2007

(65) Prior Publication Data

US 2009/0050801 A1 Feb. 26, 2009

(51) Int. Cl.
*B01D 59/44* (2006.01)
*F15C 1/18* (2006.01)

(52) U.S. Cl. ....................... 250/288; 137/808; 137/810; 239/101; 239/461; 239/463; 239/468; 261/88; 261/89; 261/96; 261/98

(58) Field of Classification Search ................. 250/281, 250/282, 291, 292, 288; 137/803, 808, 810, 137/811, 812; 239/101, 102.1, 338, 337, 239/370, 461, 463, 468, 482, 589, 590, 590.3, 239/590.5, 593, 594; 261/76, 78.1, 79.1, 261/88, 89, 96–98, 102, 105, 109–111, 115
See application file for complete search history.

(56) References Cited

U.S. PATENT DOCUMENTS 4,184,638 A * 1/1980 Ogasawara et al. ......... 239/418
4,189,101 A * 2/1980 Hughes ...................... 239/405
4,538,636 A * 9/1985 Cleland ...................... 137/216
4,635,857 A * 1/1987 Hughes ...................... 239/690
4,690,332 A * 9/1987 Hughes ...................... 239/338
4,702,415 A * 10/1987 Hughes ......................... 239/8
4,734,109 A * 3/1988 Cox ............................ 95/189
4,861,988 A 8/1989 Henion et al. ............... 290/288
5,352,892 A 10/1994 Mordehai et al. ........... 250/288
5,412,208 A 5/1995 Covey et al. ................ 250/288
5,422,787 A * 6/1995 Gourdine .................... 361/697
6,082,387 A * 7/2000 Kanazashi et al. ............ 137/14
2003/0189169 A1 10/2003 Wells et al.
2003/0201646 A1* 10/2003 Kaploun ...................... 290/54
2006/0230765 A1* 10/2006 Fedorov et al. .................. 62/5
2009/0050801 A1* 2/2009 Fedorov ..................... 250/288

OTHER PUBLICATIONS

International Search Report and Written Opinion, dated Nov. 13, 2008.
Shaffer, et al. (1997). "A novel ion funnel for focusing ions at elevated pressure using electrospray ionization mass spectrometry." Rapid Communications in Mass Spectrometry 11(16): 1813-1817.

(Continued)

*Primary Examiner*—Bernard E Souw
(74) *Attorney, Agent, or Firm*—Thomas, Kayden, Horstemeyer & Risley

(57) ABSTRACT

Briefly described, embodiments of the present disclosure include: confining/focusing vortex flow transmission structures, mass spectrometry systems including a confining/focusing vortex flow transmission structure, methods of using the confining/focusing vortex flow transmission structure, methods of using mass spectrometry system, methods of transmitting droplets and ions, methods of evaporating droplets and desolvating ions, and the like.

24 Claims, 26 Drawing Sheets
(18 of 26 Drawing Sheet(s) Filed in Color)

OTHER PUBLICATIONS

Shaffer, et al. (1998). "An ion funnel interface for improved ion focusing and sensitivity using electrospray ionization mass spectrometry." Analytical Chemistry 70: 4111-4119.

Shaffer, et al. (1999). "Characterization of an improved electrodynamic ion funnel interface for electrospray ionization mass spectrometry." Analytical Chemistry 71: 2957-2964.

Kim, et al. (2000). "Improved ion transmission from atmospheric pressure to high vacuum using a multicapillary inlet and electrodynamic ion funnel interface." Analytical Chemistry 72(20): 5014-5019.

Kim, et al. (2001). "A multicapillary inlet jet disruption electrodynamic ion funnel interface for improved sensitivity using atmospheric pressure ion sources." Analytical Chemistry 73: 4162-4170.

Tang, et al. (2002). "Independent control of ion transmission in a jet disrupter dual-channel ion funnel electrospray ionization MS interface." Analytical Chemistry 74(20): 5431-5437.

Zhou, et al. (2003), Incorporation of a venturi device in electrospray ionization, Analytical Chemistry, 75, 5978-5983.

Hawkridge, et al. (2004). "Analytical performance of a venturi device integrated into an electrospray ionization Fourier transform ion cyclotron resonance mass spectrometer for analysis of nucleic acids." Analytical Chemistry 76(14): 4118-4122.

Dixon, et al. (2007). Probing the Mechanisms of an Air Amplifier Using a LTQ-FT-ICR-MS and Flourescence Spectroscopy. American Society for Mass Spectrometry. 1-5.

* cited by examiner

CONFINING/FOCUSING VORTEX FLOW TRANSMISSION STRUCTURE, MASS SPECTROMETRY SYSTEMS, AND METHODS OF TRANSMITTING PARTICLES, DROPLETS, AND IONS

BACKGROUND

Efficient generation, collection and transmission of ions with minimum loss upon ejection of charged droplets from an ion source are of paramount importance to increase sensitivity and minimize the amount of sample required for stable mass spectrometry analysis. It is accepted that the ion production efficiency from the moment the sample solution is sprayed until it reaches the medium-vacuum regions of the MS is barely in the 0.01-0.1% range, if no special transmission enhancement methods are used. This problem has been recognized as early as in late 1980's when Henion and coworkers proposed to improve the spray formation process by using a sheath flow of nebulizing gas to enhance aerosolization. Later, Covey et al. further improved the charged droplet desolvation process with the addition of external flow of heated gas that was directed towards the nebulizer-assisted electrospray. This gas lowered the solvent load into the first MS stage and improved desolvation, translating into a 10-fold increase in sensitivity. Both of these approaches are now commonly used in modern ESI ion sources.

A more recent approach to increase ESI sensitivity focuses on improving charged droplet collection efficiency by means of electrohydrodynamic focusing of the ESI ion beam. This approach, first developed by Shaffer et al., utilized a hybrid RF-DC "ion-funnel" device, which produced an average 10-fold improvement in sensitivity. Further refinements to this approach involved the use of a multicapillary inlet and a jet disruption device placed in the 1-2 Torr region of the atmospheric pressure MS interface. Recently, Zhou et al. and Hawkridge et al. demonstrated the use of an industrial air amplifier based on the Venturi and Coanda effects to focus charged electrospray droplets resulting in an 18-fold increase in signal intensity (when a potential bias was applied to the amplifier) as well as a 34-fold reduction in the detection limit. Despite all these advances, the design and operation of droplet/ion transmission interface are far from being optimal.

SUMMARY

Briefly described, embodiments of the present disclosure include: confining/focusing vortex flow transmission structures, mass spectrometry systems including a confining/focusing vortex flow transmission structure, methods of using the confining/focusing vortex flow transmission structures, methods of using the mass spectrometry systems, methods of transmitting droplets, particles, and ions, methods of evaporating droplets and desolvating ions, and the like.

One exemplary confining/focusing vortex flow transmission structure, among others, includes: a cylindrical confining structure having a first end and a second end, wherein the cylindrical confining structure has a droplet/particle/ion inlet at the first end, wherein the cylindrical confining structure has a droplet/particle/ion outlet at the second end of the cylindrical confining structure along the center axis of the cylindrical confined structure, wherein the diameter of the first end is greater than the diameter of the second end, wherein the diameter of the cylindrical confining structure tapers from the first end of the cylindrical confining structure to the second end of the cylindrical confined structure, wherein at least one flow inlet is disposed at the first end of the cylindrical confined structure, wherein the flow inlet is adjacent the droplet/particle/ion inlet at the first end and offset relative to the center axis of the cylindrical confined structure, and wherein the gas being flowed generates a vortex cyclotron flow from the first end of the cylindrical confining structure to the second end of the cylindrical confined structure.

One exemplary mass spectrometry system, among others, includes: a first ion source; a first confining/focusing vortex flow transmission structure, comprising: a cylindrical confining structure having a first end and a second end, wherein the cylindrical confining structure has a droplet/particle/ion inlet at the first end, wherein the cylindrical confining structure has a droplet/particle/ion outlet at the second end of the cylindrical confining structure along the center axis of the cylindrical confined structure, wherein the diameter of the first end is greater than the diameter of the second end, wherein the diameter of the cylindrical confining structure tapers from the first end of the cylindrical confining structure to the second end of the cylindrical confined structure, wherein at least one flow inlet is disposed at the first end of the cylindrical confined structure, wherein the flow inlet is adjacent the droplet/particle/ion inlet at the first end and offset relative to the center axis of the cylindrical confined structure, and wherein the gas being flowed generates a vortex cyclotron flow from the first end of the cylindrical confining structure to the second end of the cylindrical confined structure; and an ion detector system, wherein the first ion source is disposed adjacent the droplet/particle/ion inlet, and wherein the first confining/focusing vortex flow transmission structure is adjacent the ion detector system.

These embodiments, uses of these embodiments, and other uses, features and advantages of the present disclosure, will become more apparent to those of ordinary skill in the relevant art when the following detailed description of the preferred embodiments is read in conjunction with the appended figures.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

The patent or patent application file contains at least one drawing executed in color. Copies of this patent or patent application publication with color drawing(s) will be provided by the Office upon request and payment of the necessary fee.

DETAILED DESCRIPTION

Figure 1:
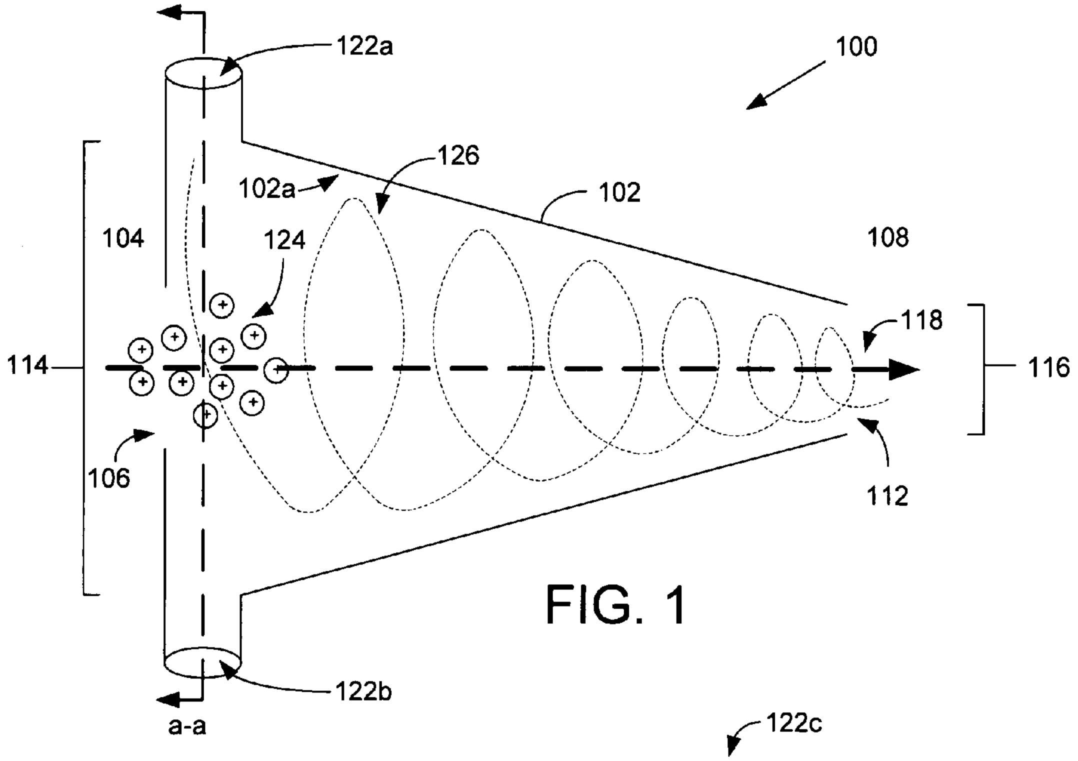
FIG. 1 illustrates a cross-sectional view of an embodiment of a confining/focusing vortex flow transmission structure.

Embodiments of the present disclosure will employ, unless otherwise indicated, techniques of fluid mechanics, heat and mass transfer, electrodynamics, analytical chemistry, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Definitions

In describing and claiming the disclosed subject matter, the following terminology will be used in accordance with the definitions set forth below.

As used herein, the term "adjacent" refers to the relative position of one or more features or structure, where such relative position can refer to being near or adjoining. Adjacent structures can be spaced apart from one another or can be in actual contact with one another. In some instances, adjacent structures can be coupled to one another or can be formed integrally with one another.

The term "desolvation" refers to evaporation of liquid solvent or desolution of a solid matrix.

The term "dry ion" refers to an ion of a chemical species (e.g., analyte of interest) in a fully desolvated (solvent or matrix-free) state.

The term "residence time" refers to the time spent by the object (e.g., droplet, ion, etc.) within a device (e.g., confining/focusing vortex flow transmission structures).

The term "vortex flow" refers to the flow with non-zero angular velocity in a cylindrical coordinate system. The term "vortex flow" is used in reference to a gas flow that can entrain a substance such as a gas or liquid mixture, mixture containing droplets or particles, mixture containing ions, and the like. In an embodiment, the substance includes a gas or liquid mixture, a mixture containing droplets or particles, a mixture containing ions that are used in conjunction with a mass spectrometry system including a ion source (an electrospray ionization source (ESI), an atmospheric pressure chemical ionization source, an inductively coupled plasma (ICP) ion source, a glow discharge ion source (e.g., DART), an electron impact ion source, a matrix assisted laser desorption/ionization ion source (MALDI), desorption electrospray ionization (DESI) ion source, ultrasonic electrospray ionization (AMUSE) ion source, nebulizer and forced-gas-assisted ion sources), and the like.

The term "focusing" refers to confining of an object (e.g., substrate such as, droplets, particles, and/or ions) or substance in space and directing the flow in a preferred direction.

General Discussion

Embodiments of the present disclosure include: confining/focusing vortex flow transmission structures, mass spectrometry systems including a confining/focusing vortex flow transmission structure, methods of using the confining/focusing vortex flow transmission structure, methods of using mass spectrometry system, methods of transmitting droplets and ions, methods of evaporating droplets and desolvating ions, and the like. Embodiments of the present disclosure provide for confining/focusing vortex flow transmission structures that are designed for droplet desolvation and ion generation and transmission. In addition, embodiments of the present disclosure can be combined with mass spectrometry systems.

In general, embodiments of the present disclosure include a confining/focusing vortex flow transmission structure having a cylindrical confining structure having a droplet/particle/ion inlet and a droplet/particle/ion outlet disposed at each end. A vortex flow (or also referred to as "vortex cyclotron flow" with some translation velocity) of a substance (e.g., gas or liquid mixture, mixture containing droplets or particles, mixture containing ions, wherein the substance can be entrained in the vortex flow) can be generated that flows from the droplet/particle/ion inlet to the ion outlet. Typically, the vortex flow is of a gas entraining substances. The vortex flow can be created by tangential intake of a substance at a controlled velocity and/or elevated pressure via one or more inlet ports. In another embodiment, the inlet ports can be positioned at the periphery (e.g., off-axis and not co-linear with the center axis of the cylindrical confined structure) of the cylindrical confined structure, on a rotating disk or ring structure, in combination with a set of flow guiding blades disposed within the cylindrical confined structure, and/or other devices and techniques enabling generation of a directed vortex flow within the confining/focusing vortex flow transmission structure. Charged particles, droplets, or ions can be flowed (entrained) in the vortex flow. The particles or droplets containing ions of one or more analytes are desolvated and focused as they are transported in the cylindrical confining structure within the vortex flow due to thermo-fluidic interactions (i.e., exchange of momentum, heat and mass) with the carrier gas stream. The charged particles or droplets have a relatively high angular velocity and a low axial velocity so that the charged particle droplets have a long residency time in the cylindrical confining structure for desolvation, while minimizing clustering/coalescing of particles or droplets due to absence of flow stagnation zones in the ion transmission interface. In addition, the charged particles or droplets or ions can be confined within the cylindrical confining structure using electrical guiding and/or focusing. The desolvated ions exiting the vortex flow can be introduced into an ion detection system (e.g., a mass spectrometry system) via combination of pressure and electrically induced forces near the exit of the confining/focusing vortex flow ion transmission and inlet to the ion detection system. In an embodiment of the present disclosure, the charged particles, droplets, and/or ions can be cooled down and thermalized prior to exiting the droplet/particle/ion outlet of the vortex flow device, so that the internal energy of charged particles, droplets, ions is lowered and made the same or nearly the same for all of them. It should be noted that in some instances the term "ion" may be referred to but this is done for clarity and the term substance (e.g., gas or liquid mixture, mixture containing droplets or particles, mixture containing ions) or any one of the definitions of substance could be used in an alternative embodiment or in combination of substances (e.g., ion, particles, droplets, and the like).

Embodiments of the present disclosure have applications in chemical and materials sciences as well as in cellular biology and medical research (e.g., DNA, proteins, polypeptides, polynucleotides, and the like). In an embodiment of the present disclosure, chemical and/or biological species in a solution or a matrix can be analyzed. In an embodiment, the confining/focusing vortex flow transmission structure can be employed in a mass spectrometry system to detect and identify chemical and/or biological species.

Embodiments of the present disclosure are advantageous for one or more of the following reasons. First, embodiments of the present disclosure are adapted to provide for a long residence time for the charged substances coming from an ion source so that the charged substances are completely or are substantially desolvated, resulting in "dry ions" of the analyte(s) prior to exiting the vortex flow of the confining/focusing vortex flow transmission structure. Second, embodiments of the present disclosure are adapted to focus the charged substances towards the outlet of the vortex flow of the confining/focusing vortex flow transmission structure. Third, embodiments of the present disclosure are adapted to avoid stagnation zones within the vortex flow structure and thus to minimize clustering/coalescence of substances in the confining/focusing vortex flow transmission structure. Fourth, embodiments of the present disclosure are adapted to produce a high angular velocity to enable large coefficients of heat /mass transfer from/to the surrounding substance (carrier gas) to/from the charged substances to achieve rapid and efficient solvent evaporation/matrix dissolution and generation of "dry ions". Fifth, embodiments of the present disclosure are adapted to produce relatively low axial (from the inlet to the outlet of the confining/focusing vortex flow transmission structure) velocity near the droplet/particle/ion outlet of the confining/focusing vortex transmission structure (or inlet of a mass spectrometry system) to enable sufficient ion residence time for their efficient introduction to a mass spectrometry system via pressure driven suction, diffusion or ionic migration. Sixth, embodiments of the present disclosure are adapted to accept a broad distribution of diameters (e.g., about 1 nm to 1 mm) of charged substances. Seventh, embodiments of the present disclosure are adapted to cool down and thermalize (thermally equilibrate) the charged substance to the same or nearly the same and low internal energy state before exiting the confining/focusing vortex flow transmission structure.

One or more advantages of one or more embodiments the present disclosure can be attributed to the generation of a vortex flow (vortex flow may also be termed a rotational or cyclotron flow, where the vortex flow refers to rotational flow with a prescribed directionality of axial translation of the vortex) from the droplet/particle/ion inlet to the droplet/particle/ion outlet of the confining/focusing vortex flow transmission structure and the high angular velocity of the charged substance within the confining/focusing vortex flow of the confining/focusing vortex flow transmission structure. The vortex flow and the high angular velocity of the charged substance ensure high mass/heat transfer rates and long travel path (along the spiral trajectories produced by the vortex flow) for the charged substance, which allows for sufficient residence time to complete or nearly complete desolvation of the charged substance. Relatively low axial velocity (as compared to the angular velocity) allows the charged particle droplets to travel slowly in the axial direction maximizing residence time required for desolvation and also reducing dispersion loses of “dry ions” prior to their introduction to a mass spectrometry system. The converging vortex flow results in the focusing of the substance toward the center axis of the confining/focusing vortex flow transmission structure and also enables achievement of the uniform state of desolvated ions at the exit of the interface upon solvent evaporation from initially a non-uniform (in size) distribution of the charged substance. In other words, the larger charged substances flow are subjected to greater centripetal force in the vortex flow and therefore flow at a greater distance from the center axis near the periphery of the vortex, which corresponds to a longer travel path and longer time necessary for desolvation of larger substances. As the larger charged substances are desolvated and become smaller, the centripetal force acting on charged substance is reduced and they move closer to the center axis. Thus, a distribution of diameters of the charged substances will travel over a distribution of distances from the center axis. But as the charged substances desolvate, the charged substance becomes progressively smaller in size and move towards the center axis, eventually becoming a tightly focused stream of “dry ions” moving toward the droplet/particle/ion outlet of the vortex flow of the confining/focusing vortex flow transmission structure or the inlet of the mass spectrometry system. Therefore, embodiments of the present disclosure include a built-in dynamic negative feedback that should enable uniform size of the charged substances as they approach the droplet/particle/ion outlet of the confining/focusing vortex flow transmission structure, eventually resulting in efficient and complete desolvation and “dry ion” generation.

As briefly mentioned above, embodiments of the present disclosure include confining/focusing vortex flow transmission structures. The confining/focusing vortex flow transmission structure includes a cylindrical, confining structure having a first end and a second end. The cylindrical, confining structure has a droplet/particle/ion inlet at the first end. In addition, the cylindrical, confining structure has droplet/particle/ion outlet at the second end of the cylindrical confining structure, which are centered around the center axis of the cylindrical confining structure. In an embodiment, the droplet/particle/ion inlet and outlet can be positioned off of the center axis of the cylindrical confining structure. In an embodiment, the diameter of the cylindrical, confining structure tapers from the first end of the cylindrical, confining structure to the second end of the cylindrical, confining structure, so that the diameter of the first end is greater than the diameter of the second end. In another embodiment, the diameter of the cylindrical confining structure tapers from the first end of the cylindrical confining structure to close to the second end of the cylindrical confining structure (See, FIG. 6). In an embodiment, heaters can be positioned to heat one or more portions of the confining/focusing vortex flow transmission structure (e.g., to maximize desorption).

At least one flow inlet (e.g., 1, 2, 3, 4, 5, 6, or more) is disposed near the first end of the cylindrical confining structure. The flow inlet is adjacent the droplet/particle/ion inlet at the first end and offset relative to the center axis of the cylindrical confining structure (e.g., not in-line with the droplet/particle/ion inlet or the droplet/particle/ion source (e.g., perpendicular, substantially perpendicular, or otherwise offset relative to the center axis)). The carrier substance (e.g., carrier gas) being flowed through the flow inlet generates a vortex flow from the first end of the cylindrical confining structure to the second end of the cylindrical confining structure. The carrier gas can include, but is not limited to, air (heated or unheated, fully dry or not), an inert gas (e.g., argon and helium, heated or unheated, fully dry or not), nitrogen, ammonia, hydrocarbons, carbon dioxide, other gases, and combinations thereof. The chemical composition, temperature, and/or velocity of the carrier gas can be controlled (e.g., to maximize desorption).

Embodiments of the cylindrical confining structure can have an internal surface such as, but not limited to: the internal surface of the cylindrical confining structure is linear relative the center axis, the internal surface of the cylindrical confining structure is convex relative the center axis, the internal surface of the cylindrical confining structure is concave relative the center axis, the internal surface of the cylindrical confining structure is grooved to guide the vortex cyclotron flow, and combinations of these internal surfaces.

In an embodiment, charged substances (droplets, particles and/or ions) are generated external to the cylindrical confining structure and enter or are guided into the cylindrical confining structure via the droplet/particle/ion inlet. In another embodiment, charged substances are generated at the entrance of the droplet/particle/ion inlet or within the cylindrical confined structure. The charged substances are entrained in the vortex cyclotron flow and travel from the first end of the cylindrical confining structure to the second end of the cylindrical confined structure, where all of the “dry ions” or a portion of the ions exit the ion outlet.

Embodiments of the present disclosure can include at least one electrode disposed adjacent the cylindrical confining structure with an electric potential (AC or DC or combination of both DC and AC) applied to the electrode to electrostatically repel the charged substances from the surface of the cylindrical confined structure, which can increase ion transmission through the cylindrical confined structure. In another embodiment, the electrode can be disposed within the cylindrical confining structure or disposed on the outside of the cylindrical confined structure. The electrode can be disposed on the surface of the cylindrical confining structure and/or be in electrical communication with the inside surface of the cylindrical confined structure.

Embodiments of the present disclosure can include a mass spectrometry system including an embodiment of confining/focusing vortex flow transmission structure. The mass spectrometry system includes a source of charged droplets, particles and/or ions, a confining/focusing vortex flow transmission structure, and an ion detection system. The source and the ion detection system are described in detail below in reference to FIGS. 5 through 8. In addition, a number of embodiments of the confining/focusing vortex flow transmission structure are described in reference to FIGS. 5 through 8.

FIG. 1 illustrates a cross-sectional view of an embodiment of a confining/focusing vortex flow transmission structure 100. The confining/focusing vortex flow transmission structure 100 includes a cylindrical confining structure 102 having a first end 104, a second end 108, and a flat inner surface 102*a*.

The cylindrical confining structure 102 has a droplet/particle/ion inlet 106 at the first end 104. In addition, the cylindrical confining structure 102 has a droplet/particle/ion outlet 112 at the second end 108 of the cylindrical confining structure 102, which has a center along the center axis 118 of the cylindrical confining structure 102. The diameter of the cylindrical confining structure tapers from the first end 104 of the cylindrical confining structure 102 to the second end 108 of the cylindrical confining structure 102, so that the diameter 114 of the first end 104 is greater than the diameter 116 of the second end 108. The cylindrical confining structure includes two gas flow inlets 122*a* and 122*b* disposed at the first end 104 of the cylindrical confining structure 102. The gas flow inlets 122*a* and 122*b* are adjacent the droplet/particle/ion inlet 106 at the first end 104 and offset relative to the center axis of the cylindrical confining structure 118. The gas being flowed through the gas flow inlets 122*a* and 122*b* generates a vortex flow from the first end 104 of the cylindrical confining structure 102 to the second end 108 of the cylindrical confining structure 102. The gas flow inlets 122*a* and 122*b* can be interfaced with source of pressurized carrier gas to generate a specific gas pressure and flow velocity. The gas flow velocity can be about 10 m/s to 200 m/s, and inlet pressure between about 1 bar and 20 bars. The Higher and lower velocities and pressure are also possible depending on the specific embodiment and operating conditions.

Charged substances (droplets, particles and/or ions) 124 (shown to be positive only for the sake of example, and should be understood that this includes both positive and negative ions) are introduced to the cylindrical confining structure 102 via the droplet/particle/ion inlet 106. The charged droplets, particles and/or ions are entrained in the vortex flow 126 and travel from the first end 104 of the cylindrical confining structure 102 to the second end 108 of the cylindrical confining structure 102, where all of the ions or a portion of the ions exit the droplet/particle/ion outlet 112.

The cylindrical confining structure 102 can be made of materials such as, but not limited to, stainless steel, aluminum, brass, copper, poly(methyl methacrylate) (PLEXIGLAS® and ACRYLITE®), cured polymer, glass, ceramics, and other materials, and also possibly coated to make the surfaces selectively electrically conducting or dielectric. The cylindrical confining structure 102 can have a length (from droplet/particle/ion inlet to outlet) of about 1 cm to 10 m, about 5 cm to 1 m, and about 10 cm to 50 cm. The first end of the cylindrical confining structure can have a diameter 114 of about 5 mm to 20 cm, about 1 cm to 10 cm, and about 2 cm to 5 cm. The second end of the cylindrical confining structure can have a diameter 116 of about 1 mm to 20 cm, about 5 mm to 10 cm, and about 1 cm to 5 cm. It should be noted that embodiments of the present disclosure could be scaled up or down by 2×, 3×, or more of the dimensions provided above as long as the features of the cylindrical confining structure are substantially retained.

Figure 2A:
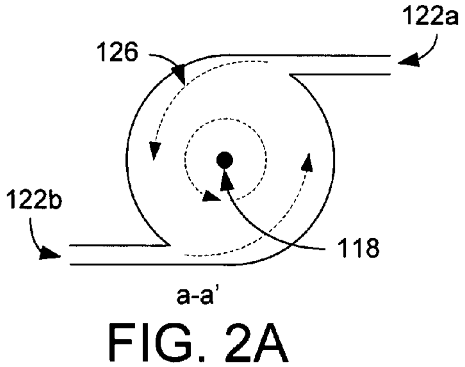
FIG. 2A is a cross-sectional view along the a-a' axis of the confining/focusing vortex flow transmission structure shown in FIG. 1.

FIG. 2A is a cross-sectional view along the a-a' axis of the confining/focusing vortex flow transmission structure 100 shown in FIG. 1. The gas can enter the cylindrical confining structure 102 via the gas flow inlets 122*a* and 122*b* and generate a vortex flow 126 around the center axis 118 of the cylindrical confining structure 102.

Figure 2B:
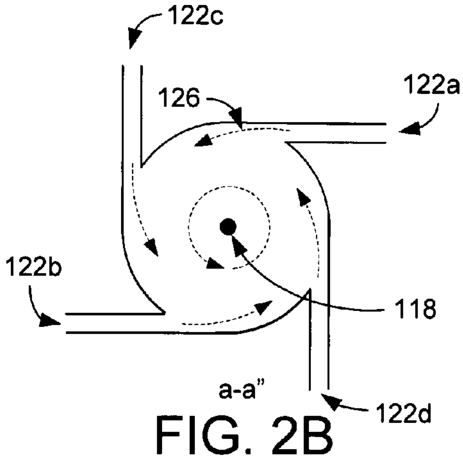
FIG. 2B illustrates an alternative embodiment of a cross-sectional view along the a-a" axis of the confining/focusing vortex flow transmission structure shown in FIG. 1.

FIG. 2B illustrates an alternative embodiment of a cross-sectional view along the a-a" axis of the confining/focusing vortex flow transmission structure 100 shown in FIG. 1. The gas can enter the cylindrical confining structure 102 via the gas flow inlets 122*a*-122*d* and generate a vortex flow 126 around the center axis 118 of the cylindrical confining structure 102.

Figure 2C:
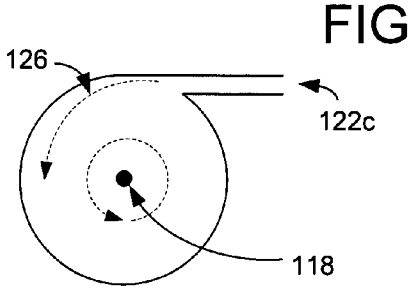
FIG. 2C illustrates an alternative embodiment of a cross-sectional view of the confining/focusing vortex flow transmission structure having only one gas flow inlet.

FIG. 2C illustrates an alternative embodiment of a cross-sectional view of the confining/focusing vortex flow transmission structure 100 having only one flow inlet 122*c*. The gas can enter the cylindrical confining structure 102 via the flow inlet 122*c* and generate a vortex flow 126 around the center axis 118 of the cylindrical confining structure 102. It should be noted that one, two, three, four, or more gas flow inlets could be included in embodiments of the present disclosure. It should be noted that the gas flow inlets do not have to be in the same plane (a-a) and could be staggered along the length of the cylindrical confining structure 102.

Figure 3A:
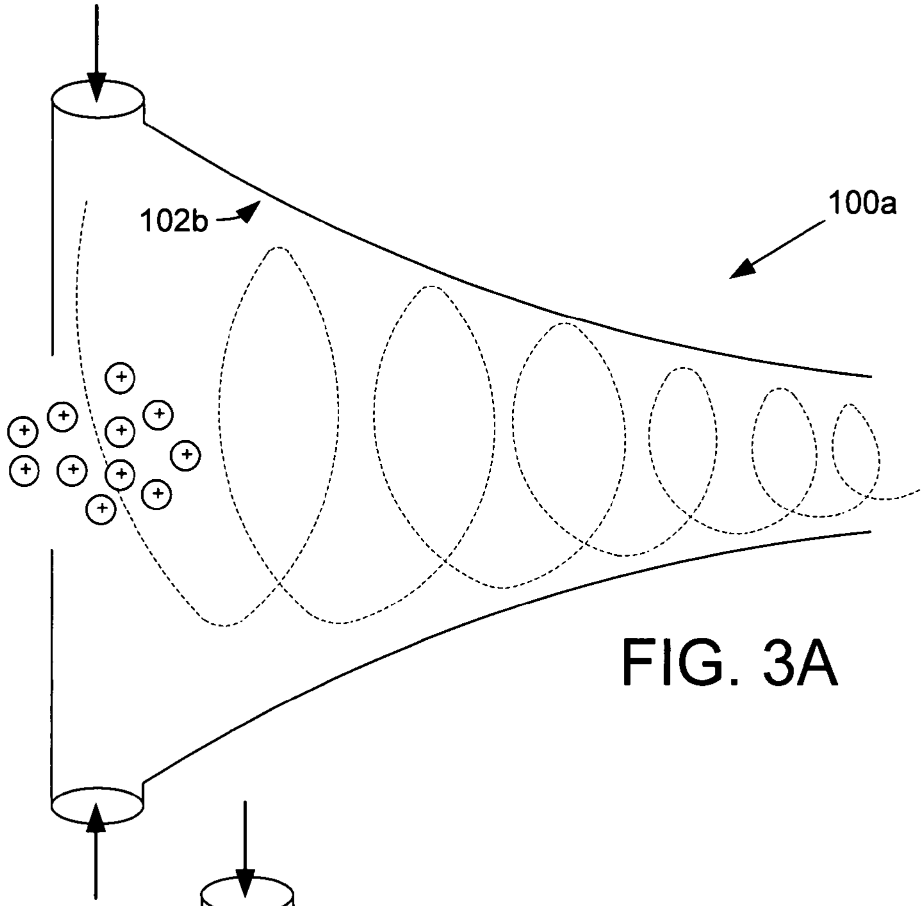
FIG. 3A illustrates an alternative embodiment of a cross-sectional view of a confining/focusing vortex flow transmission structure having a concave inner surface.

FIG. 3A illustrates an alternative embodiment of a cross-sectional view of a confining/focusing vortex flow transmission structure 100*a* having a concave inner surface 102*b*.

Figure 3B:
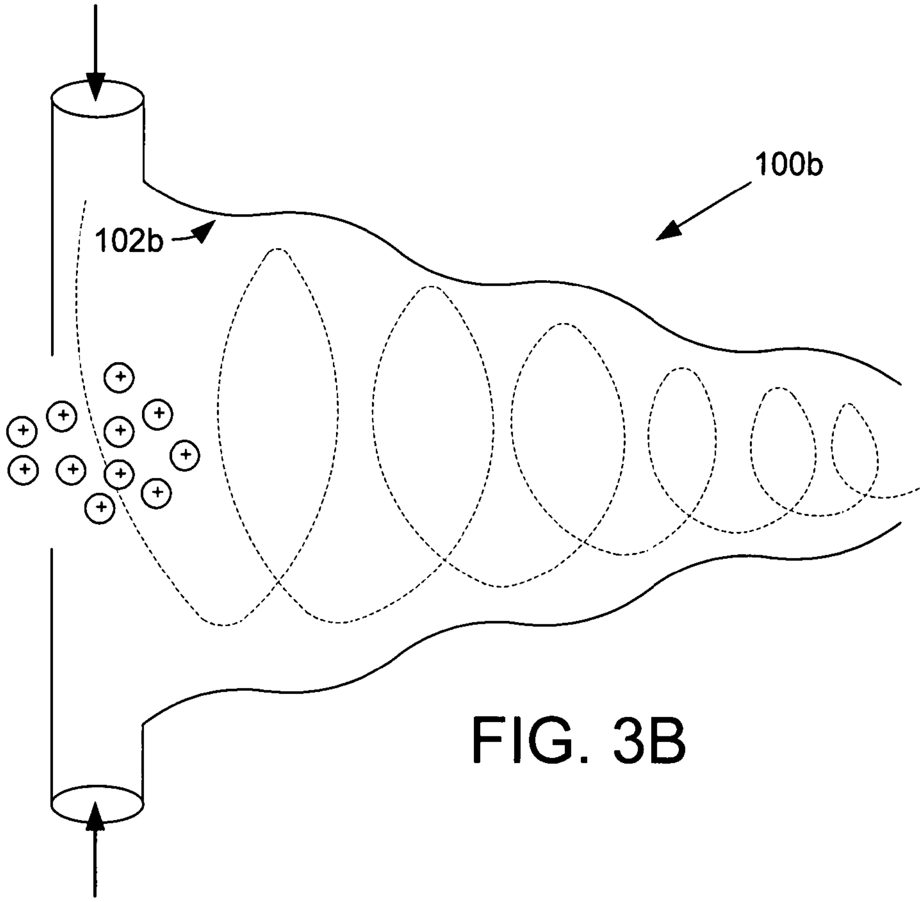
FIG. 3B illustrates an alternative embodiment of a cross-sectional view of a confining/focusing vortex flow transmission structure having flow guiding structure (tracks) on an inner surface.

FIG. 3B illustrates an alternative embodiment of a cross-sectional view of a confining/focusing vortex flow transmission structure 100*b* having a grooved (or threaded), screw-like or rifled inner surface 102*b*.

Figure 4A:
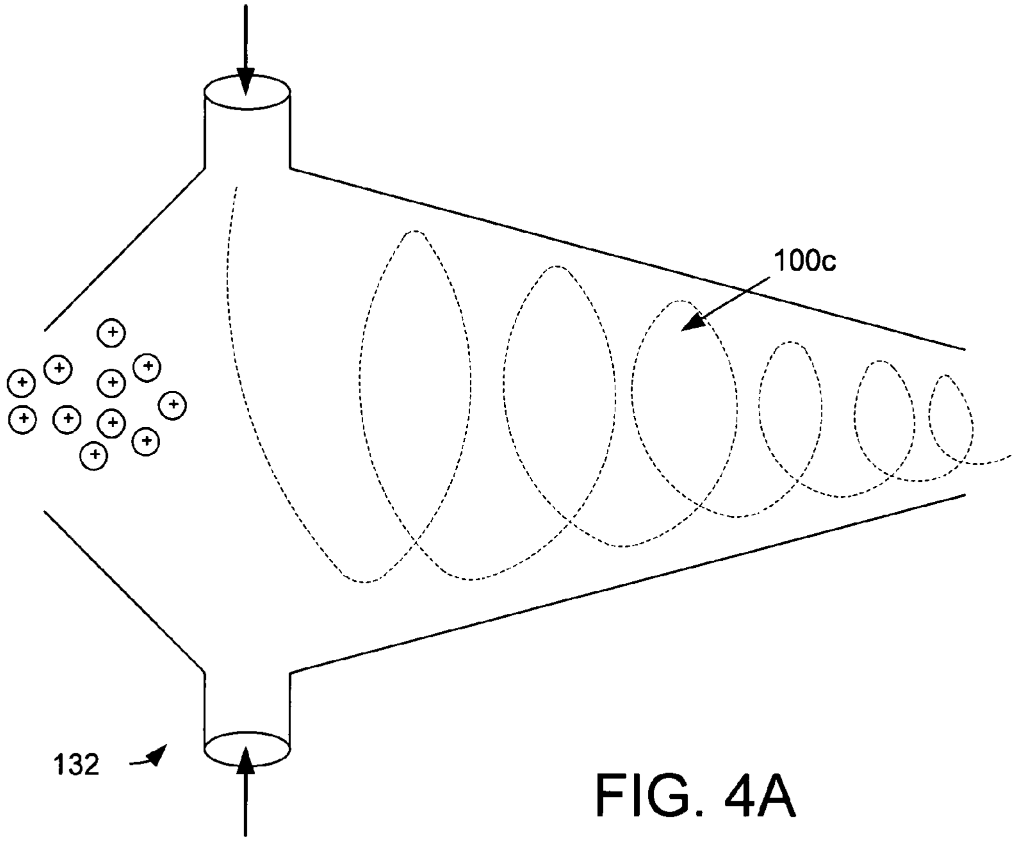
FIG. 4A illustrates an alternative embodiment of a cross-sectional view of a confining/focusing vortex flow transmission structure having an angled first end.

FIG. 4A illustrates an alternative embodiment of a cross-sectional view of a confining/focusing vortex flow transmission structure 100*c* having an angled first end 132 (angled out from the confining/focusing vortex flow transmission structure 100*c*).

Figure 4B:
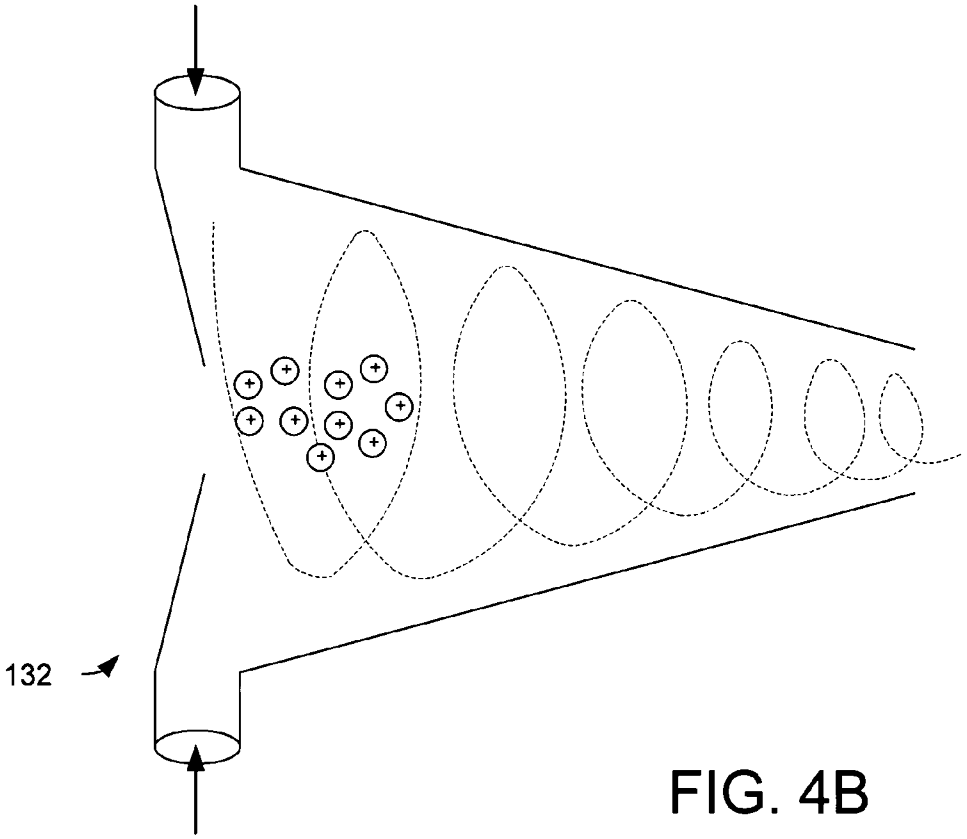
FIG. 4B illustrates another alternative embodiment of a cross-sectional view of a confining/focusing vortex flow transmission structure having an angled first end.

FIG. 4B illustrates an alternative embodiment of a cross-sectional view of a confining/focusing vortex flow transmission structure 100*c* having an angled first end 132 (angled into the confining/focusing vortex flow transmission structure 100*c*).

Figure 5A:
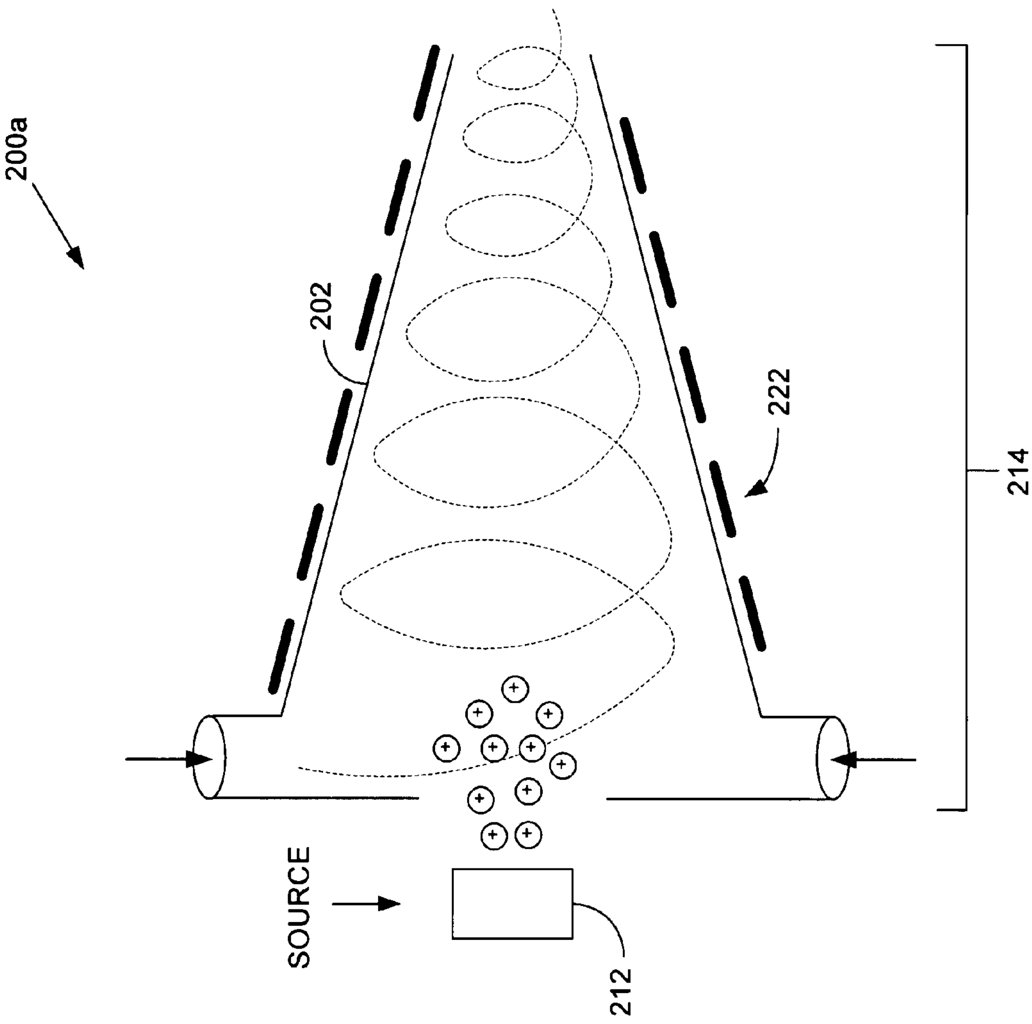
FIG. 5A illustrates an embodiment of a confining/focusing vortex flow transmission structure with an electrodynamic enhancement using guiding electrodes.

FIG. 5A illustrates an embodiment of a confining/focusing vortex flow transmission structure 200*a* with an electrodynamic enhancement using charged droplet/particle/ion guiding electrodes 222. The confining/focusing vortex flow transmission structure 200*a* with an electrodynamic enhancement using guiding electrodes 222 includes a source 212 of charged droplets, particles and/or ions and a confining/focusing vortex flow transmission structure 214 (a cross-sectional view in FIG. 5B).

The source 212 functions to generate charged droplets, particles and/or ions that can be introduced to the confining/focusing vortex flow transmission structure 214. The source 212 can be disposed adjacent the confining/focusing vortex flow transmission structure 214 (as shown) or a charged droplet/particles/ions guiding system (e.g., electrostatic lens system, ion trap system, and aerodynamic stream entrainment system such as an industrial air amplifier, and combinations thereof) can be positioned between the source 212 and the confining/focusing vortex flow transmission structure 214. The source 212 can include, but is not limited to, an electrospray ionization source (ESI), an atmospheric pressure chemical ionization source, an inductively coupled plasma (ICP) ion source, a glow discharge ion source (e.g., DART), an electron impact ion source, a matrix assisted laser desorption/ionization ion source (MALDI), desorption electrospray ionization (DESI) ion source, ultrasonic electrospray ionization (AMUSE) ion source, nebulizer and forced-gas-assisted ion sources, and others.

It should be noted that the source 212 could be interfaced with sample system for introducing a sample to the source. The sample system can include, but is not limited to, a gas chromatograph system, a liquid chromatography system, a fluidic system for selective delivery of different samples, and automated fluid charging system such as a pump, pipette and pipette array, and solid (matrix-embedded) sample handling system.

The confining/focusing vortex flow transmission structure 214 includes an electrode 222 disposed adjacent (e.g., in electrical communication with the cylindrical confining structure 202 or insulated from the cylindrical confining structure 202 but providing an electric field within the cylindrical confining structure 202). It should be noted that the electrode 222 could be disposed within the cylindrical confining structure 202 (in electrical communication with the cylindrical confining structure 202 or electrically insulated from the cylindrical confining structure 202). The electrode 222 could include a single structure or could include a plurality of electrically isolated structures. An AC or DC current can be applied to the electrode 222. The electrode be made of materials such as, but not limited to, metals (gold, platinum, copper, aluminum, and the like), electrically conducting polymers, and other materials. The potential applied to each electrically isolated structure of an electrode (in this embodiment and others) can be individually controlled between about 0 V and about 10 kV, about 500 V and about 5 kV, about 1 kV and about 3 kV. An electrode 222 can be disposed along an entire length of the ion transmission interface 202 or in parts of it.

Figure 5B:
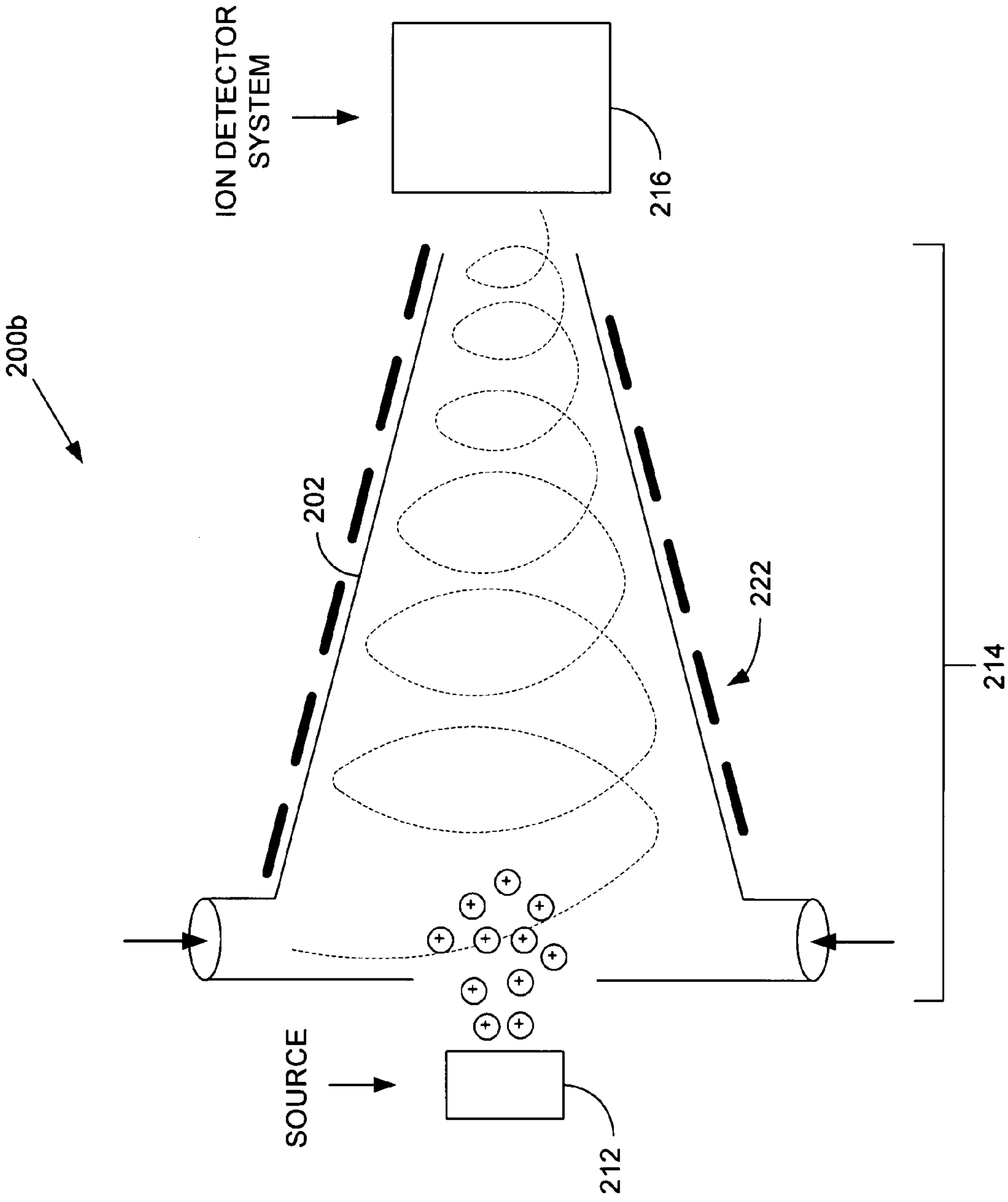
FIG. 5B illustrates an embodiment of a mass spectrometry system including the confining/focusing vortex flow transmission structure with electrodynamic enhancement using guiding electrodes.

FIG. 5B illustrates an embodiment of a mass spectrometry system 200. The mass spectrometry system 200*b* includes a source 212, a confining/focusing vortex flow transmission structure 214 (a cross-sectional view), and an ion detection system 216. The ion source 212 is similar to that described above in reference to FIG. 5A.

The ion detector system 216 functions to detect the ions generated by the source 212 and that pass through the confining/focusing vortex flow transmission structure 214. The ion detector system 216 can include mass spectrometry detector systems, ion mobility spectrometer, electrochemical sensors, and other ion analysis systems.

The mass spectrometry system can include, but are not limited to, a time-of-flight (TOF) mass spectrometry system, an ion trap mass spectrometry system (IT-MS), a quadrapole (Q) mass spectrometry system, a magnetic sector mass spectrometry system, an ion cyclotron resonance (ICR) mass spectrometry system, and combinations thereof. The mass spectrometry system can include an ion detector for recording the number of ions that are subjected to an arrival time or position in a mass spectrometry system, as is known by one skilled in the art. Ion detectors can include, for example, a microchannel plate multiplier detector, an electron multiplier detector, or a combination thereof. In addition, the mass spectrometry system may include, but is not limited to, electrostatic lens system, vacuum system components and electric system components, as are known by one skilled in the art.

In an embodiment, two or more confining/focusing vortex flow transmission structures (each having an ion source) can be operated in parallel in conjunction with a single ion detector system.

Figure 6:
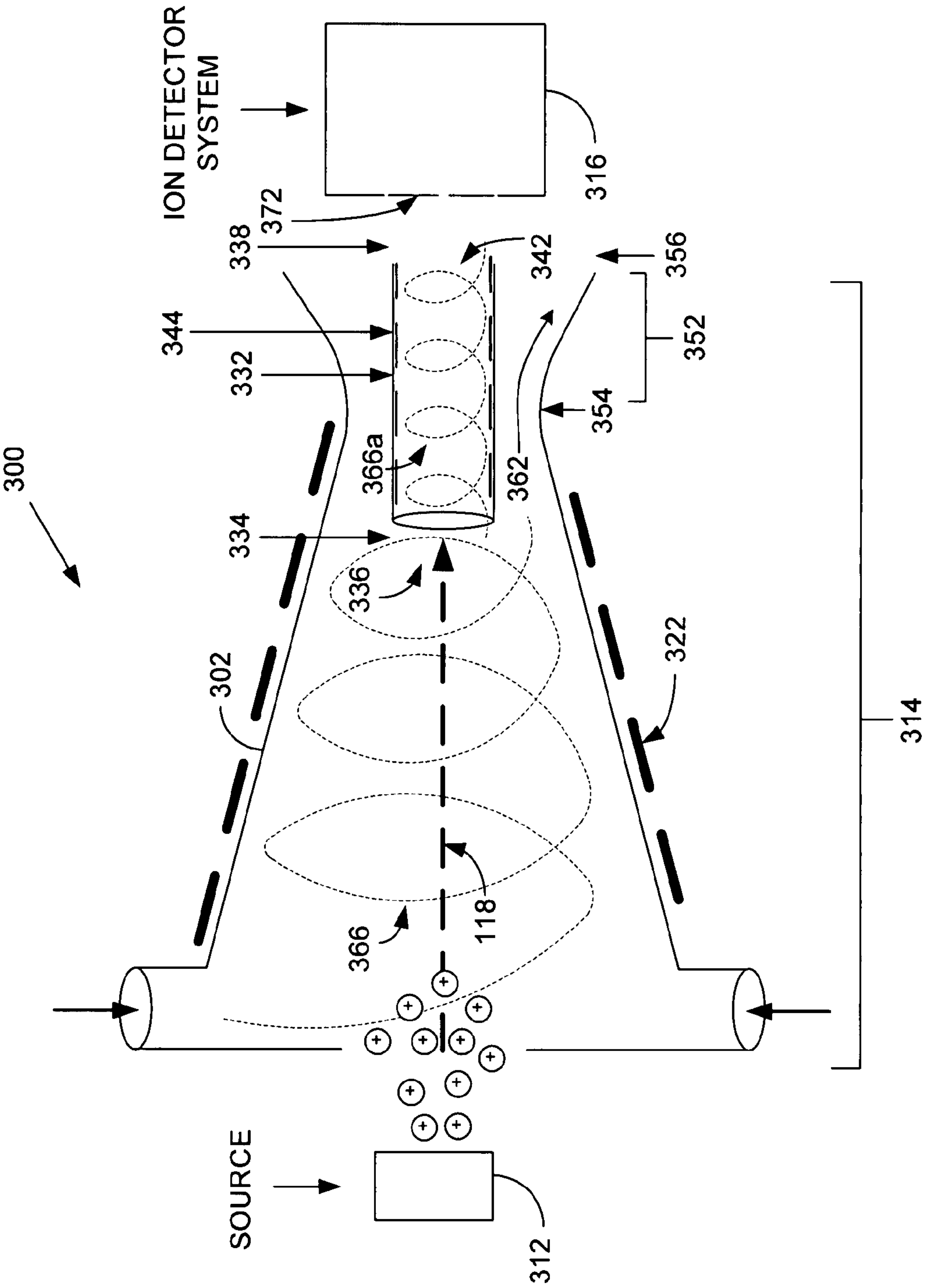
FIG. 6 illustrates an embodiment of a mass spectrometry system.

FIG. 6 illustrates an embodiment of a mass spectrometry system 300. The mass spectrometry system 300 includes a source 312, a confining/focusing vortex flow transmission structure 314 (a cross-sectional view along the axis 118), and a detection system 316. The source 312 and the detection system 316 are similar to the source 212 and the detection system 216 described in reference to FIG. 5.

The confining/focusing vortex flow transmission structure 314 is similar to the other confining/focusing vortex flow transmission structures described herein. However, the confining/focusing vortex flow transmission structure 314 includes a diverging section 352 disposed at the end of the confining/focusing vortex flow transmission structure 314. The diverging section 352 could be an add-on portion (not shown) or could be part of the confining/focusing vortex flow transmission structure 314 (shown). The diverging section 352 has a first end 354 at the second end of the cylindrical confining structure 302 and a second end 356. The diameter of the first end 354 is less than the diameter of the second end 356. The diameter of the diverging section 352 tapers from the second end 356 of the diverging section 352 to the first end 354 of the diverging section 352.

The diverging section 352 can be made of the same material as the cylindrical confining structure 302. The diameter of the first end of diverging section 352 can be the same as the diameter of the second end of the cylindrical confining structure 302. The diameter of the second end 356 of the diverging section 352 can be about 2 mm to 40 cm, about 1 cm to 20 cm, and about 2 cm to 10 cm.

In addition, FIG. 6 illustrates an ion confinement/vortex preservation structure 332 disposed within the cylindrical confining structure 302. The ion confinement/vortex preservation structure 332 has the same center axis 118 as the cylindrical confining structure 302. The ion confinement/vortex preservation structure 332 has a first end 334 and a second end 338. The first end 334 is within or near the second end of the cylindrical confining structure 302, while the second end 338 is positioned adjacent the detector system 316. The diameter of the ion confinement/vortex preservation structure is less than the diameter of the second end of the cylindrical confining structure 302 so that gas can flow 362 between the ion confinement/vortex preservation structure 332 and the cylindrical confining structure 302 and the diverging section 352. A portion of the ions can flow 366*a* into the opening 336 of the first end 334 of the ion confinement/vortex preservation structure 332 and out of the opening 342 of the second end 338 of the ion confinement/vortex preservation structure 332 towards the detector system 316.

The ion confinement/vortex preservation structure 332 includes an electrode 344 disposed adjacent the surface of the ion confinement/vortex preservation structure 332 with an electric potential (AC or DC or combination of both DC and AC) applied to the electrode to electrostatically repel the charged droplets, particles and/or ions from the surface of the ion confinement/vortex preservation structure 332. This electrode 334 is similar to the electrode 222 described in reference to FIG. 5, albeit the dimensions could be different to conform to the dimensions of the ion confinement/vortex preservation structure 332.

It should be noted that the ion confinement/vortex preservation structure 332 can be cooled as a result of the expansion and therefore cooling of the gas flowing 362 between the ion confinement/vortex preservation structure 332 and the cylindrical confining structure 302 and the diverging section 352. This may be advantageous because lowering and thermalizing (equating across the distribution) internal energy of ions prior to introduction to the detection system 316 can increase detection sensitivity and resolution.

The confining/focusing vortex flow transmission structure 332 can be: a cylinder having a uniform diameter from the first end 334 to the second end 338 (as shown); a cylinder where the first end has a first diameter and the second end has a second diameter and where the first diameter is greater than the second diameter; or a cylinder where the first end has a first diameter and the second end has a second diameter and where the first diameter is less than the second diameter.

The ion detection system 316 includes an orifice plate 372 that can have a voltage (DC or AC) applied to the orifice plate 372 to attract ions to the orifice of the orifice plate 372.

As discussed above, the confining/focusing vortex flow transmission structure 332 can include an electrode disposed adjacent the surface of the ion confinement/vortex preservation structure to electrodynamically guide ions into and within the ion confinement/vortex preservation structure. This electrode is similar to the electrode 222 described in reference to FIG. 5.

Figure 7:
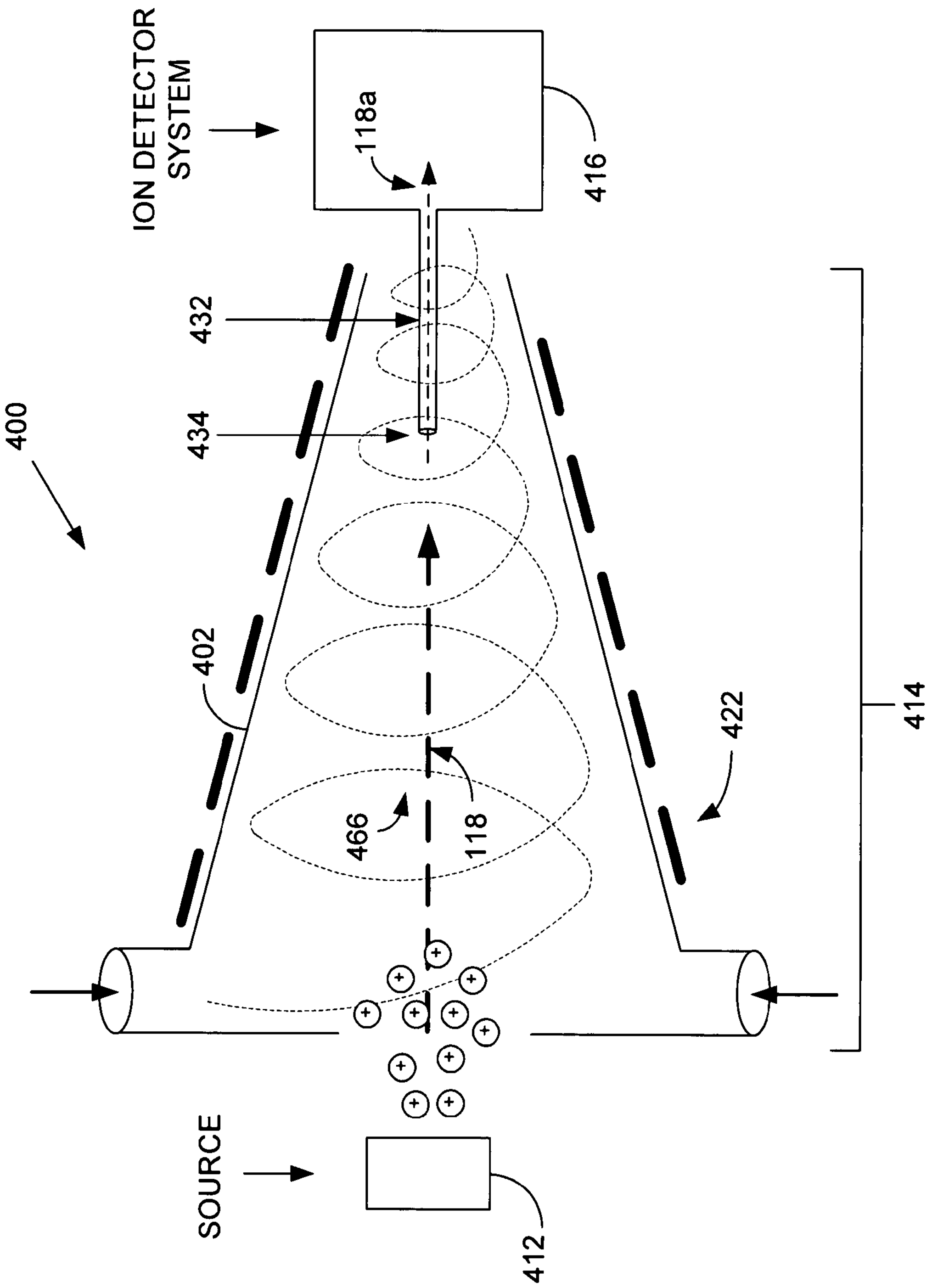
FIG. 7 illustrates an embodiment of a mass spectrometry system.

FIG. 7 illustrates an embodiment of a mass spectrometry system 400. The mass spectrometry system 400 includes a source 412, a confining/focusing vortex flow transmission structure 414 (a cross-sectional view along the axis 118), and a detection system 416. The source 412 and the detection system 416 are similar to the source 212 and the detection system 216 described in reference to FIG. 5. Although not shown in FIG. 5, the detector system includes a sampling orifice structure. The sampling orifice structure includes an orifice flush or substantially flush with the surface of the sampling orifice structure that ions flow through.

However, the detection system 416 is different in that it includes an elongated perforated sampling capillary structure 432 that extends into the cylindrical confining structure 402. The elongated perforated sampling capillary structure 432 includes an orifice 434 at the tip (not shown) that ions flow through. In addition, the elongated perforated sampling capillary structure 432 may include perforations along the entire length or part of the length of the elongated perforated sampling capillary structure 432 that ions enter and can flow into the ion detection system 416. The elongated perforated sampling capillary structure 432 shares the same center axis 118*a* as the cylindrical confining structure 302. In an embodiment, a voltage (DC and/or AC) can be applied to the elongated perforated sampling capillary structure 432 to attract ions towards and into the elongated perforated sampling capillary structure 432. In another embodiment, an electrode system can be disposed within the capillary structure 432 and/or on the outside of the capillary structure 432 to assist in guiding the ions into and through the elongated perforated sampling capillary structure 432. In an embodiment, a voltage (DC and/or AC) can be applied to the elongated perforated sampling capillary structure 432 to attract ions to the elongated perforated sampling capillary structure 432 and an electrode system can be disposed within the capillary structure 432 and/or on the outside of the capillary structure 432 to assist in guiding the ions through the elongated perforated sampling capillary structure 432. In another embodiment, the ion detection system 416 can include an electrode system to guide the ions into and/or through one or more portions of the ion detection system 416.

Figure 8:
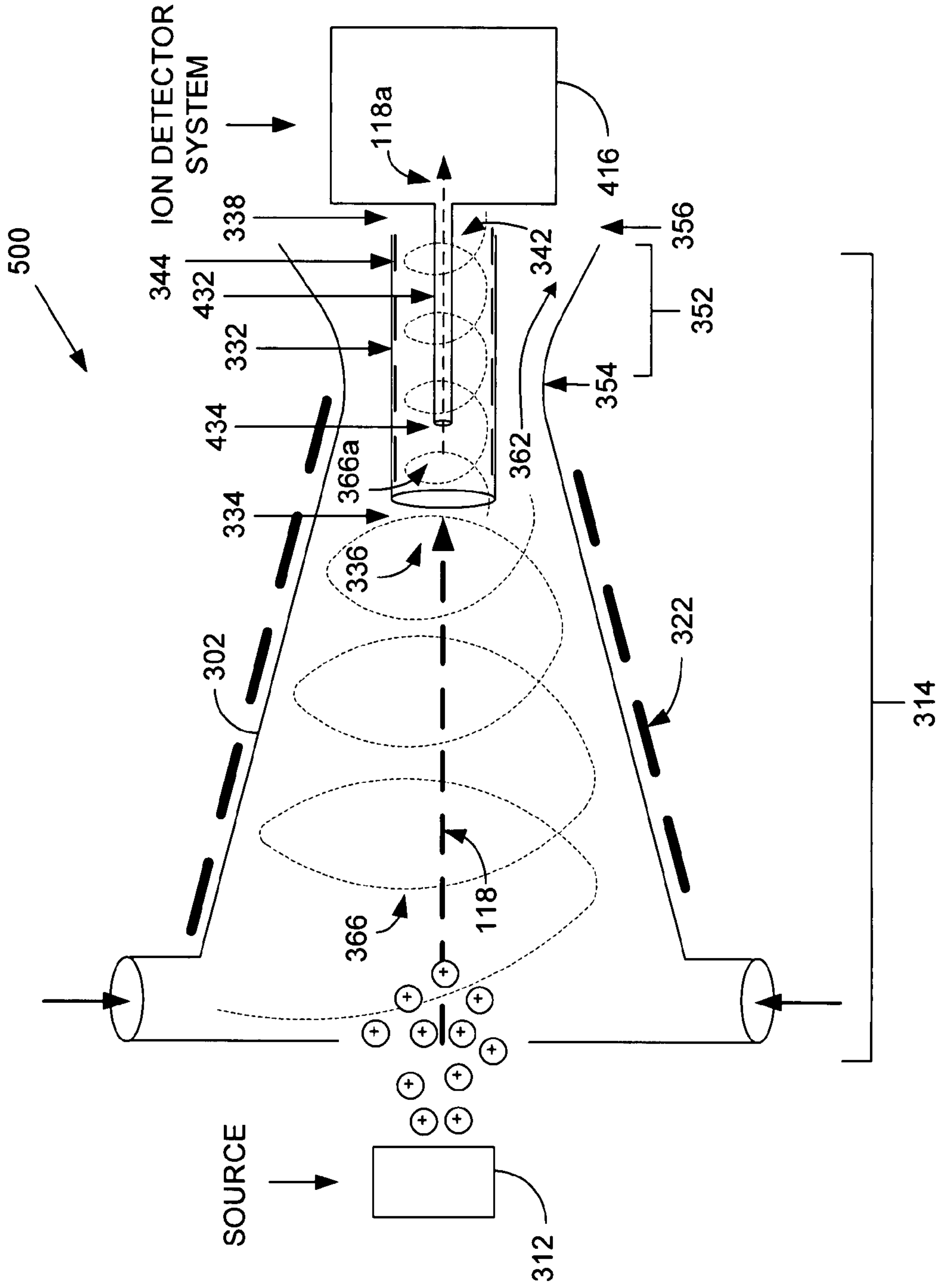
FIG. 8 illustrates another embodiment of a mass spectrometry system.

FIG. 8 illustrates an embodiment of a mass spectrometry system 500 that includes the elongated perforated sampling capillary structure 432 described in reference to FIG. 7 with the diverging section 352 and the ion confinement/vortex preservation structure 332 described in FIG. 6. In particular, the elongated perforated sampling capillary structure 432 is disposed within the ion confinement/vortex preservation structure 332. The components described in reference to FIG. 8 are similar to those described in FIGS. 6 and 7. This configuration allows for controlled desolvation and focusing/confining of charged particles/droplets towards the axis 118, resulting in highly efficient generation of ions and their introduction with minimal loss into the ion detection system 416 in a cooled down and thermolized state.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In addition, the phrase "about 'x' to 'y'" includes "about 'x' to about 'y'".

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

EXAMPLE

Now having described the embodiments of the disclosure, in general, the example describes some additional embodiments. While embodiments of present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Figure 9:
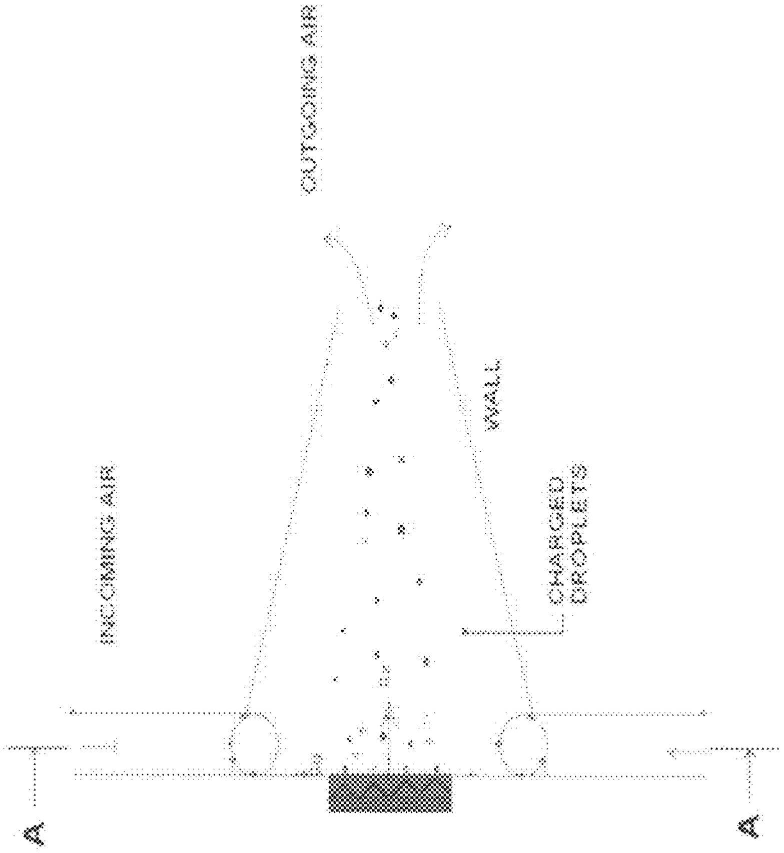
FIG. 9 illustrates a basic structure of simulated droplet/ion transmission device.

Analysis of flow field and evaporation of analyte/solvent droplets by an Atmospheric Pressure Vortex Droplet Ion Cyclotron Transmission Interface (referred hereafter as "droplet/ion transmission device") has been carried out focusing on application in bioanalytical mass spectrometry. The simulations have been performed using commercial CFD software FLUENT. Details of the flow field and droplet behavior inside the interface are presented and discussed. A basic design of the analyzed droplet/ion transmission device is shown in FIG. 9. Other device shapes, e.g., exponential or helical horns with flow guiding grooves, are expected to behave similarly and could be designed and optimized for a specific application in mind.

The goals of the analysis include, but are not limited to: predict characteristics of vortex air flow in the conically shaped droplet/ion transmission device with different operating conditions (specified inlet velocity vs. specified inlet pressure) at the vortex generating air intake pipes; simulate transport and evaporation of water/methanol droplets injected into the vortex air flow generated by the droplet/ion transmission device; and simulate and study the effect of various geometric and boundary/operating conditions on the flow and droplet behavior.

FLUENT CFD software was used to model gas flow in the device. The droplet transport and vaporization were simulated using the FLUENT's Discrete Phase Model for prediction of multiphase flow. The geometry and computational meshes of the device were created using GAMBIT software and then used in FLUENT simulations. The prototype of the ion transmission interface has been designed based on the dimensions obtained from simulations, built in glass to visualize the flow field in the device, and tested in the laboratory. The results of experiments demonstrated the validity of conclusions from FLUENT simulations about the focusing/confining properties of the vortex flow and efficient droplet evaporation enabled by the disclosed ion transmission interface.

Results and Discussion

Vortex Flow of Air Without Droplet Transport

Figure 10A:
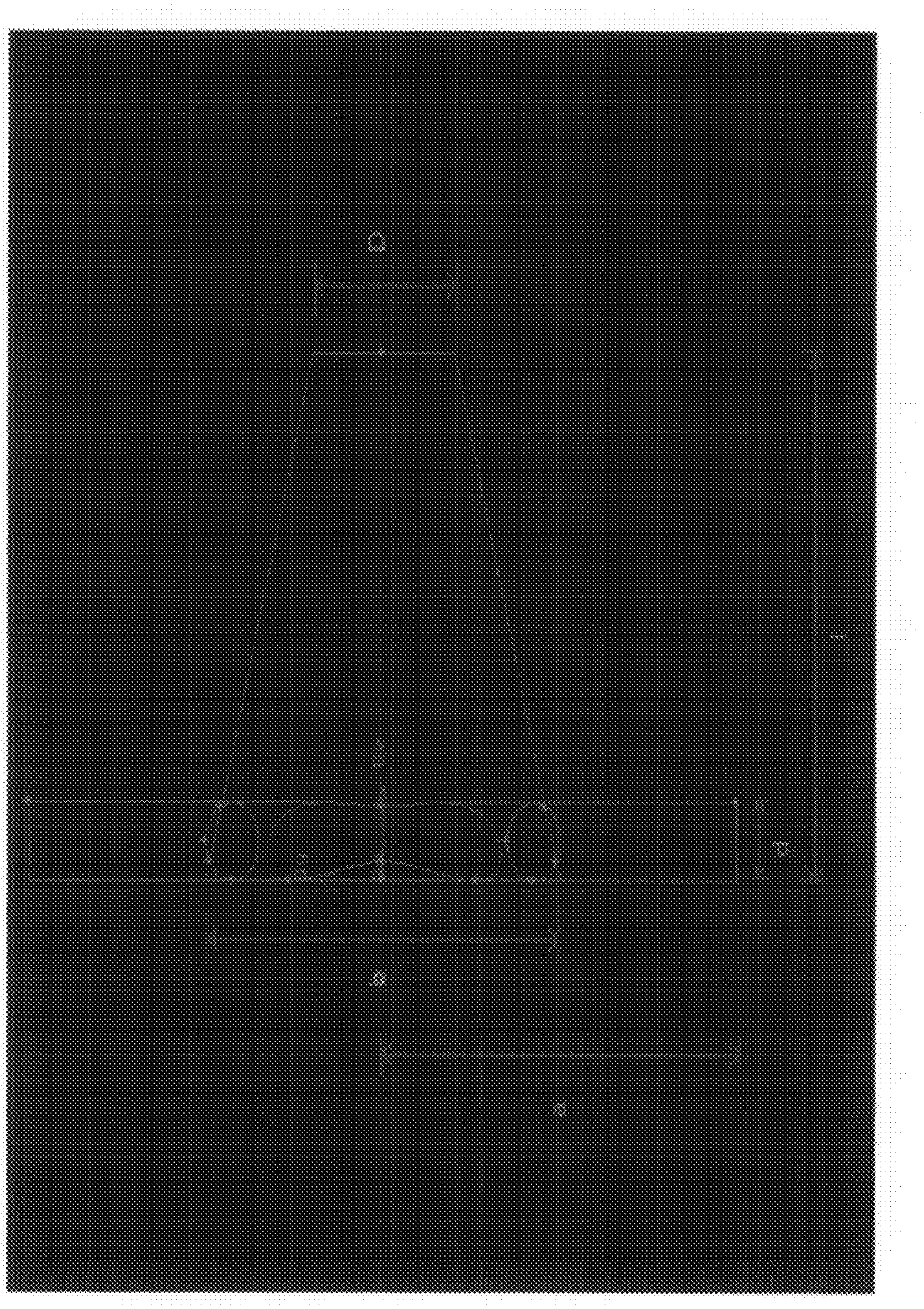
FIG. 10*a* is a side view of droplet/ion transmission device.
Figure 10B:
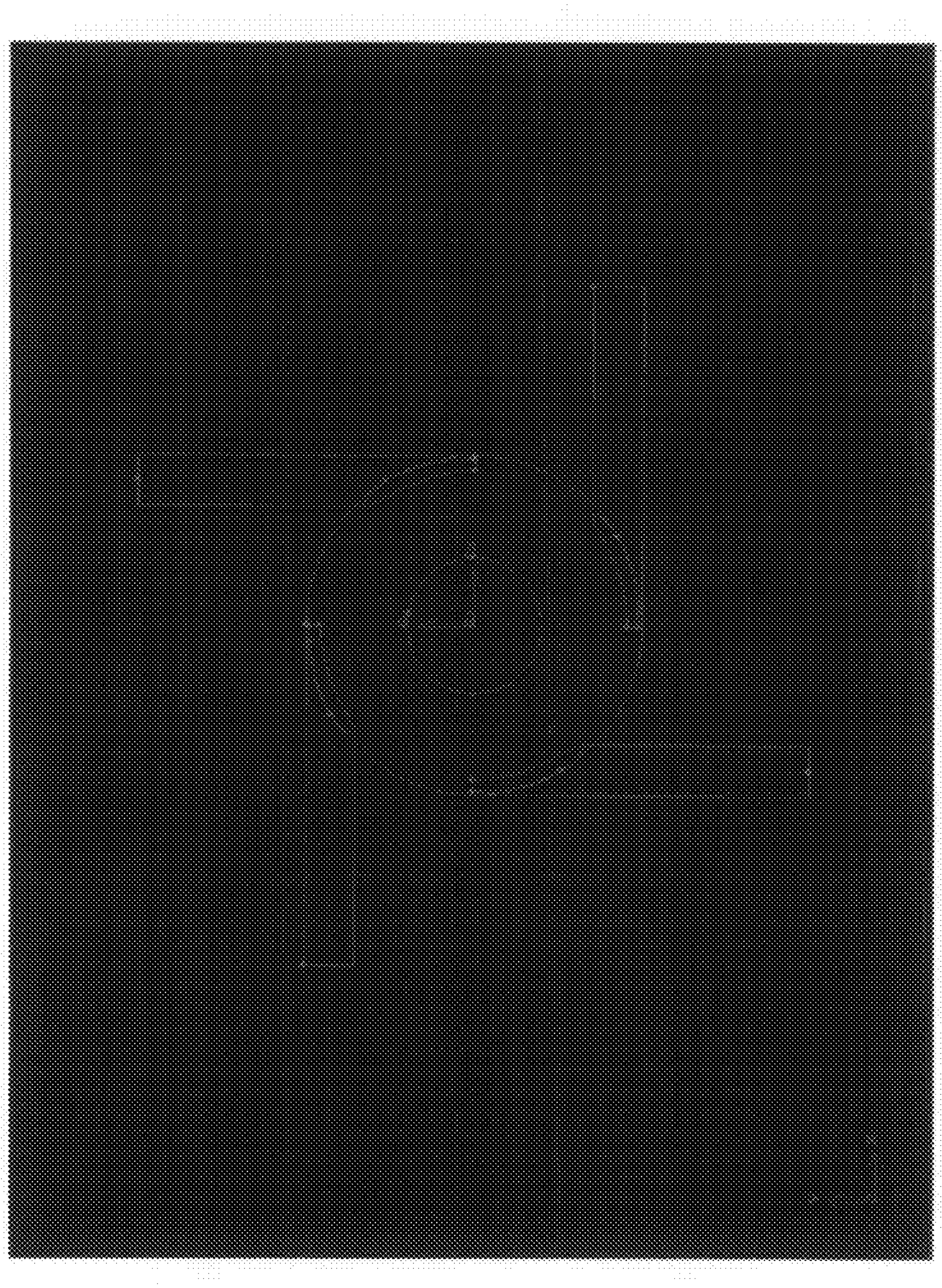
FIG. 10*b* is a side and front view of droplet/ion transmission device.
Figure 11:
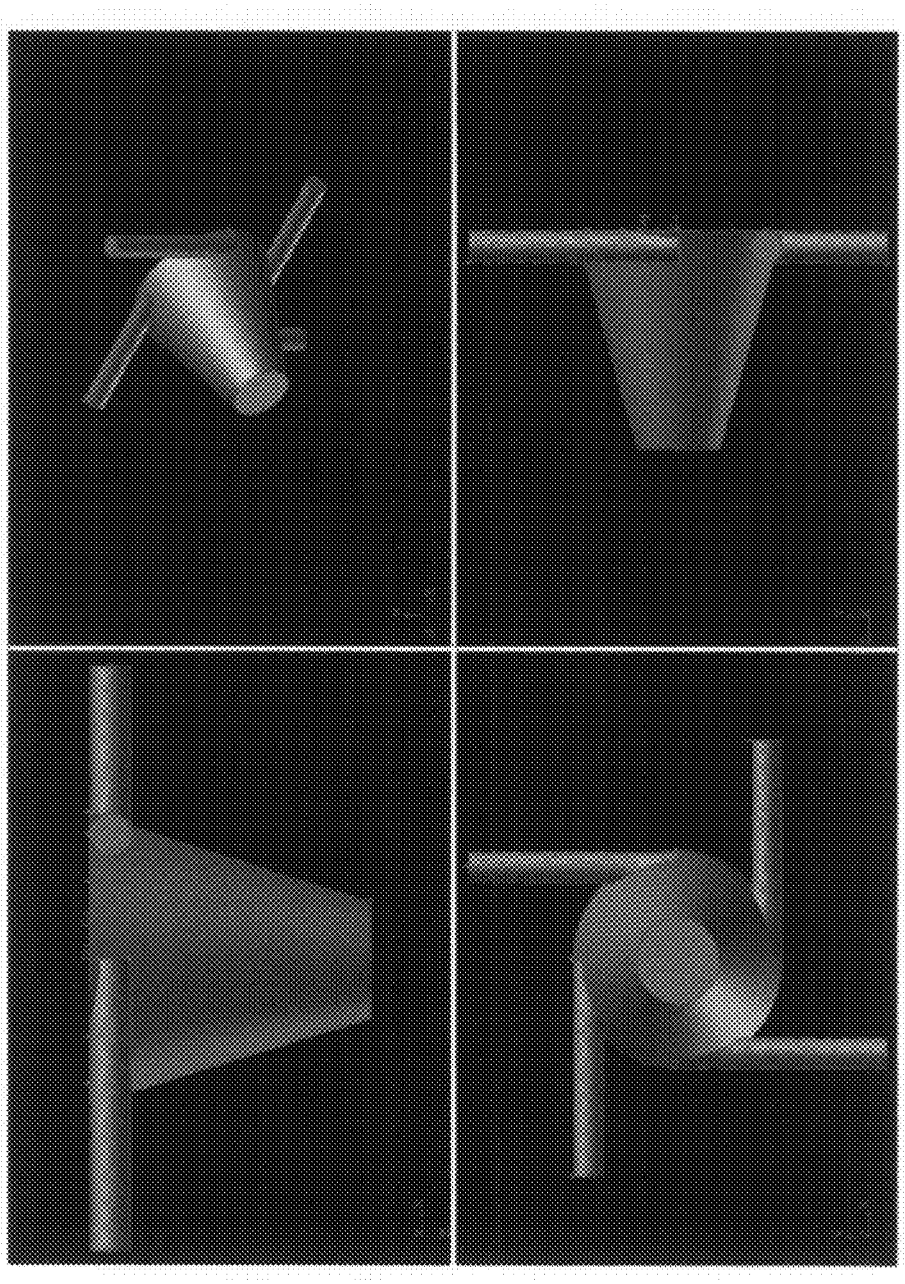
FIG. 11 is a 3-D view of droplet/ion transmission device.
Figure 12:
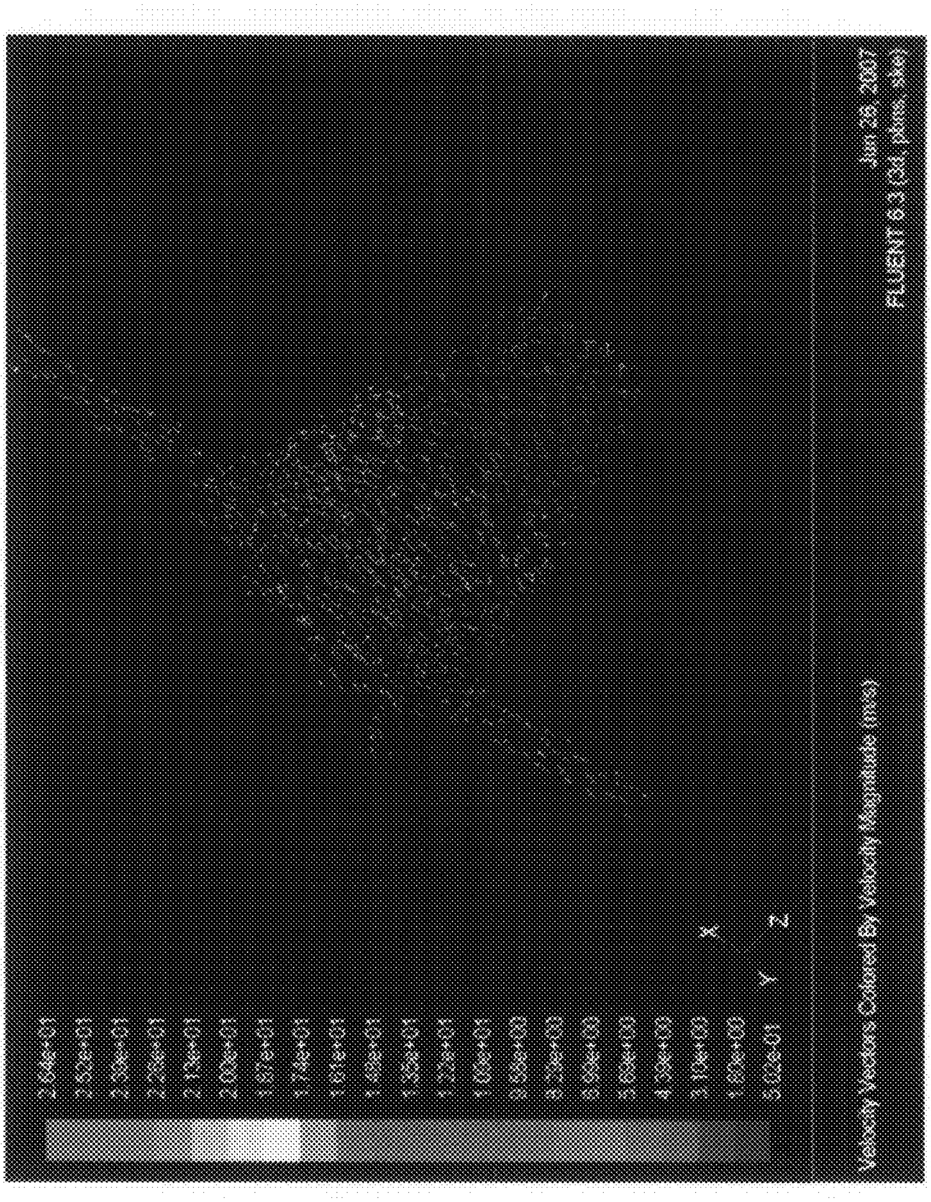
FIG. 12 illustrates velocity vectors (isometric view) of the vortex flow in the device.
Figure 13:
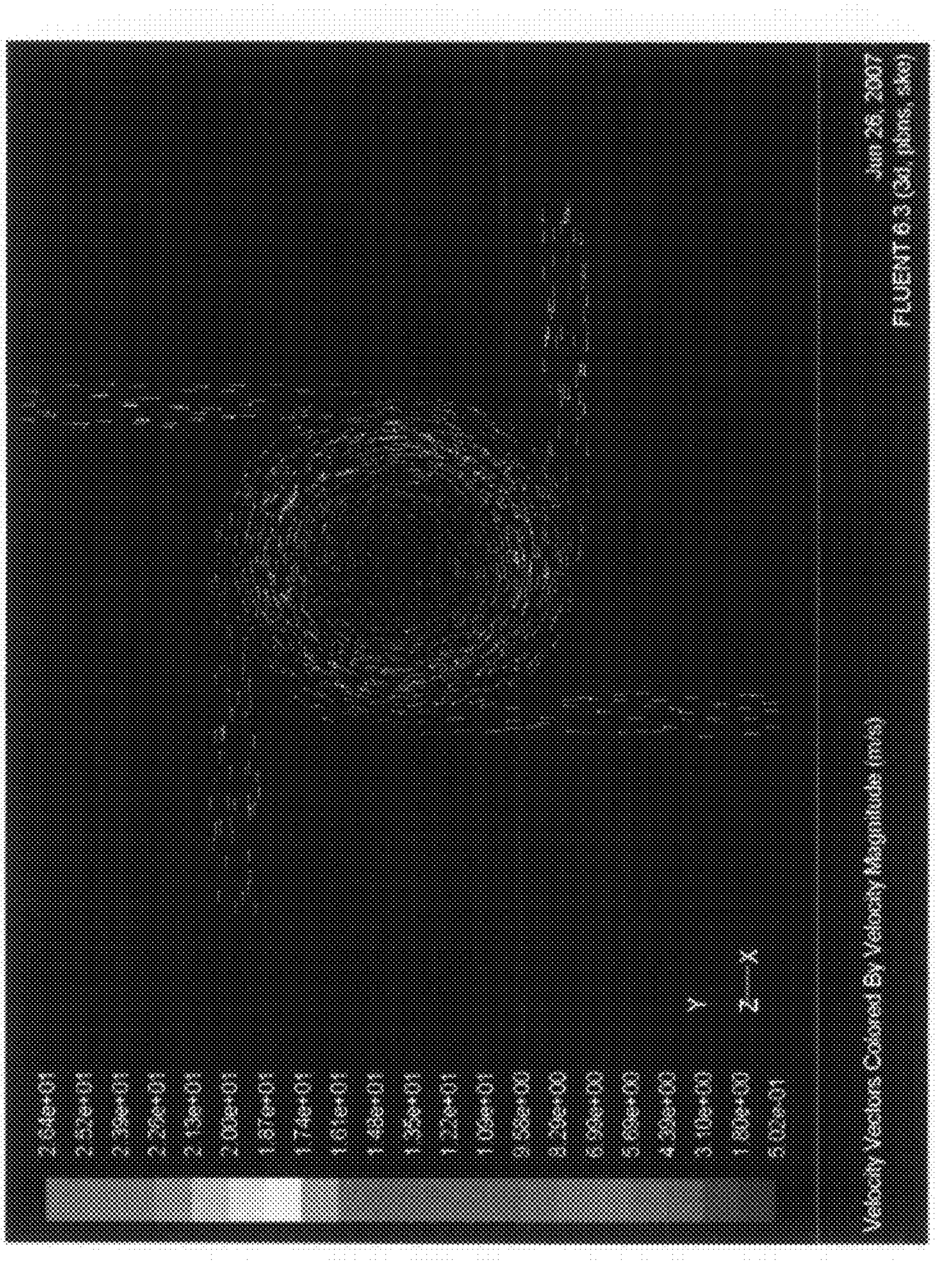
FIG. 13 illustrates velocity vectors (front view) of the vortex flow in the device.
Figure 14:
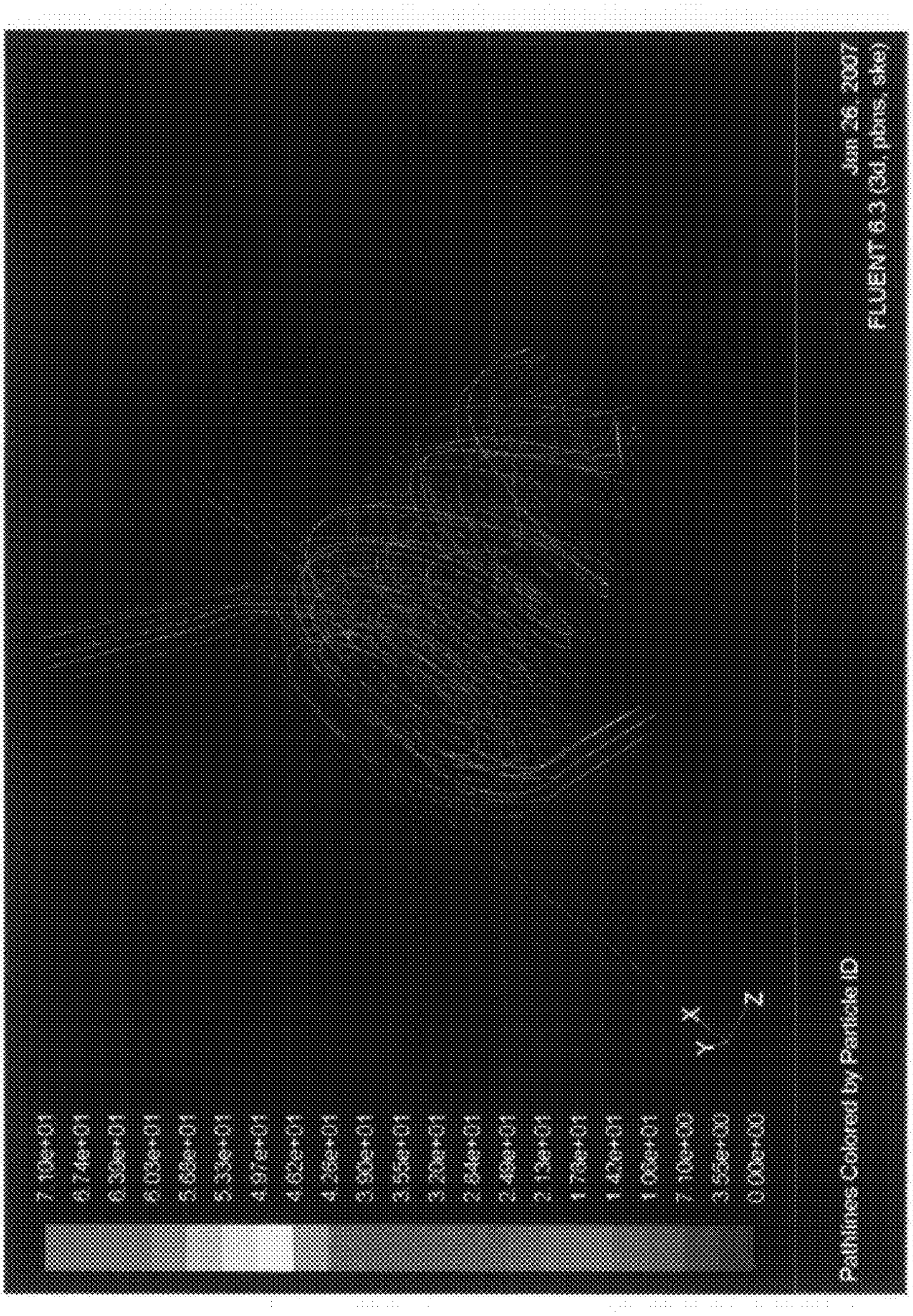
FIG. 14 illustrates converging (helical) vortex airflow streamlines (isometric view).
Figure 15:
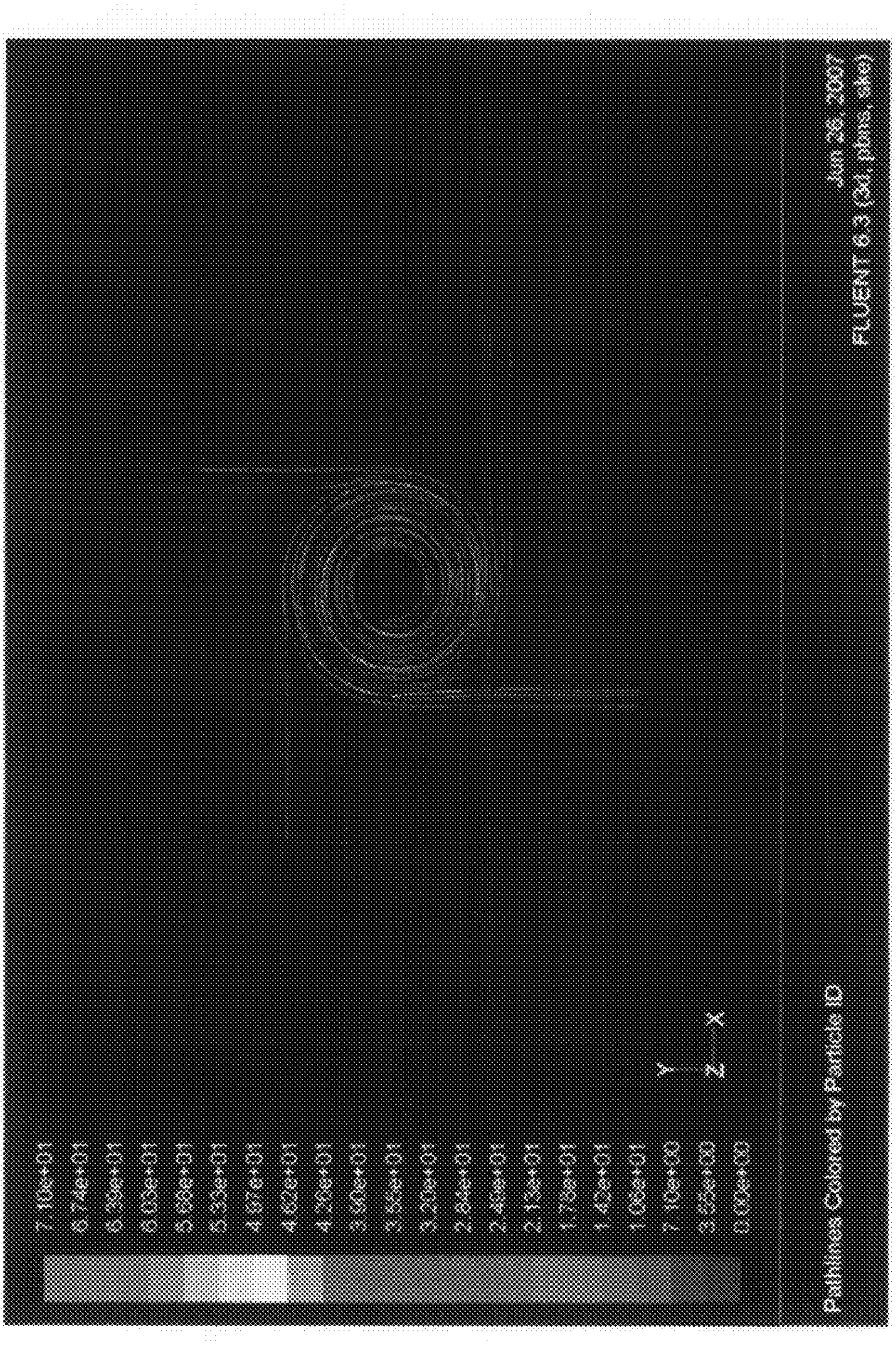
FIG. 15 illustrates converging (helical) vortex airflow streamlines (front view).

FIGS. 10 and 11 show the geometry (projection and 3-D views) of the simulated device with the following baseline dimensions used for the CFD analysis.

Length of interface: I=20 mm

Larger/inlet diameter of the cone: b=20 mm

Smaller/outlet diameter of the cone: D=8 mm

Intake pipe diameter: d=3 mm

Intake pipe length: a=20 mm

FIGS. 12 through 15 show converging/focusing/confining vortex flow pattern and helical streamlines followed by air molecules upon transmission through the device, predicted by FLUENT.

Figure 16:
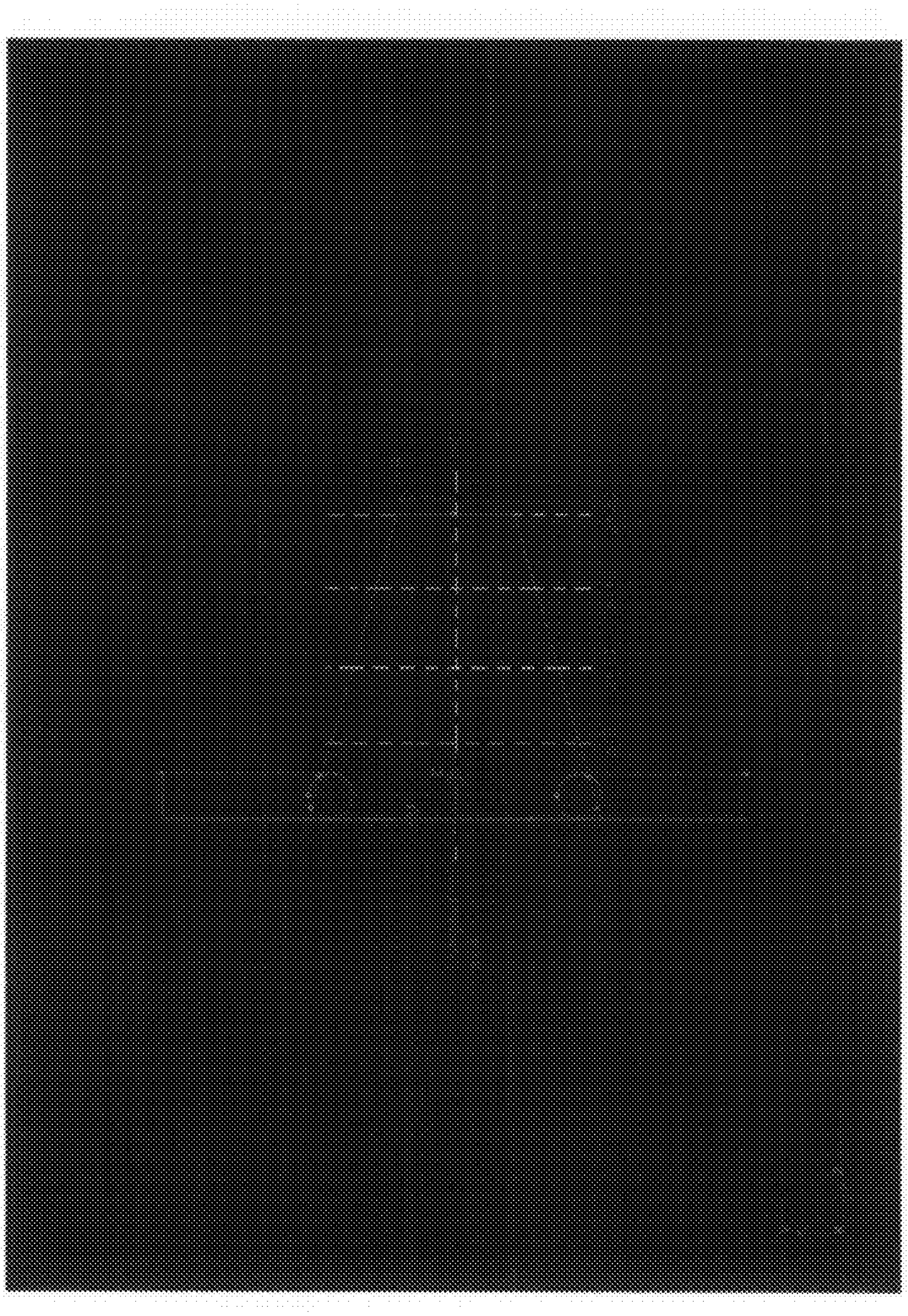
FIG. 16 illustrates the location of cross sections (z=5, 10, 15 and 20 mm) for reporting detailed velocity profiles.

FIG. 16 shows the coordinate system and indicates a set of different locations along the axis (z) of the device which will be later used for reporting detailed velocity distribution as observed in the flow realized by the droplet/ion transmission device.

Velocity components (radial, tangential, and axial) are plotted along the radius at different cross sections (as defined in FIG. 16) along the axis of the device. The simulations are for the air intake velocity of 20 m/s and 1 bar pressure at the device exit.

Figure 17:
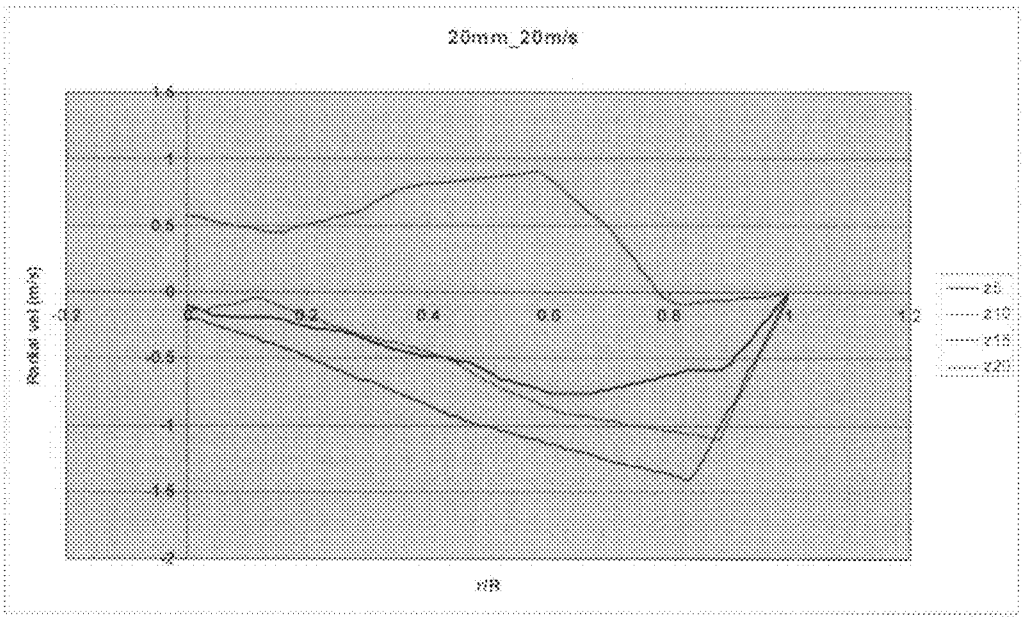
FIG. 17 illustrates the radial velocity as function of dimensionless radius at different cross-sections.

In particular, radial velocity (FIG. 17) is zero at the wall r/R=1 (no slip condition) and vanishes (within the numerical accuracy of computations) at the axis r/R=0 for all cross-sections. The radial velocity reaches its maximum amplitude near the wall. In general, the radial velocity is negative in sign (i.e., pointing inward towards the centerline of the device), thus proving flow focusing properties of the analyzed droplet/ion transmission interface. The velocity changed direction at the outlet where air is exhausted to an open atmosphere and thus undergoes an expansion with positive (outward direction) values of radial velocity.

Figure 18:
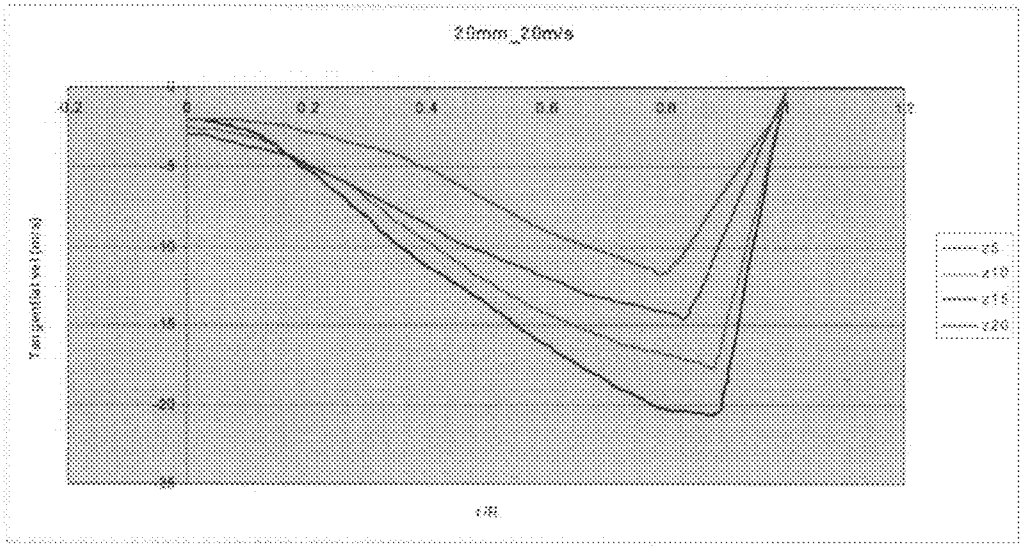
FIG. 18 illustrates the tangential velocity as function of dimensionless radius at different cross-sections.

Tangential velocity follows distribution shown in FIG. 18. As expected, it is greatest in magnitude in the vicinity (near the wall) of the interface, creating favorable conditions for fast evaporation of bigger droplets, which are concentrated (by centripetal forces) near the walls.

Figure 19:
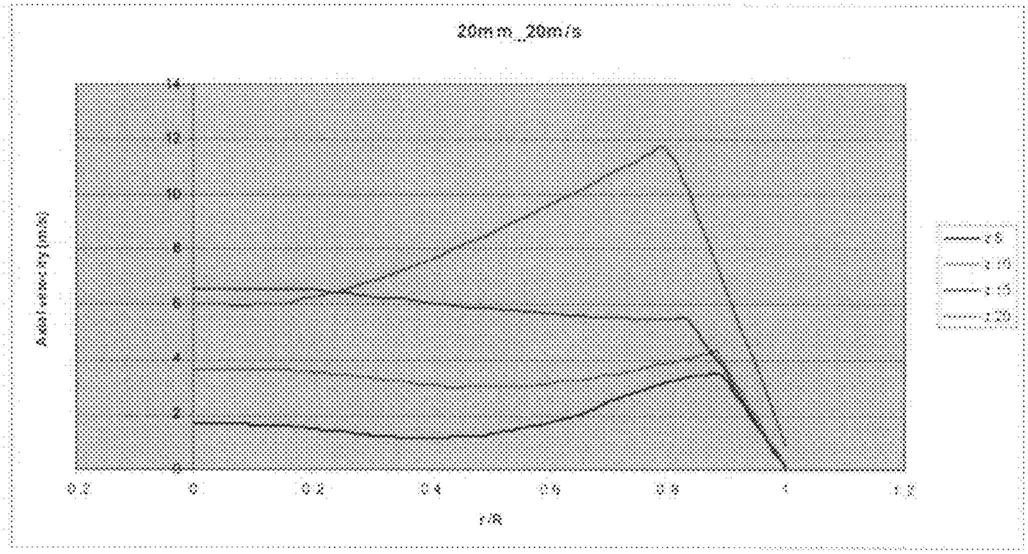
FIG. 19 illustrates the axial velocity as function of dimensionless radius at different cross-sections.
Figure 20:
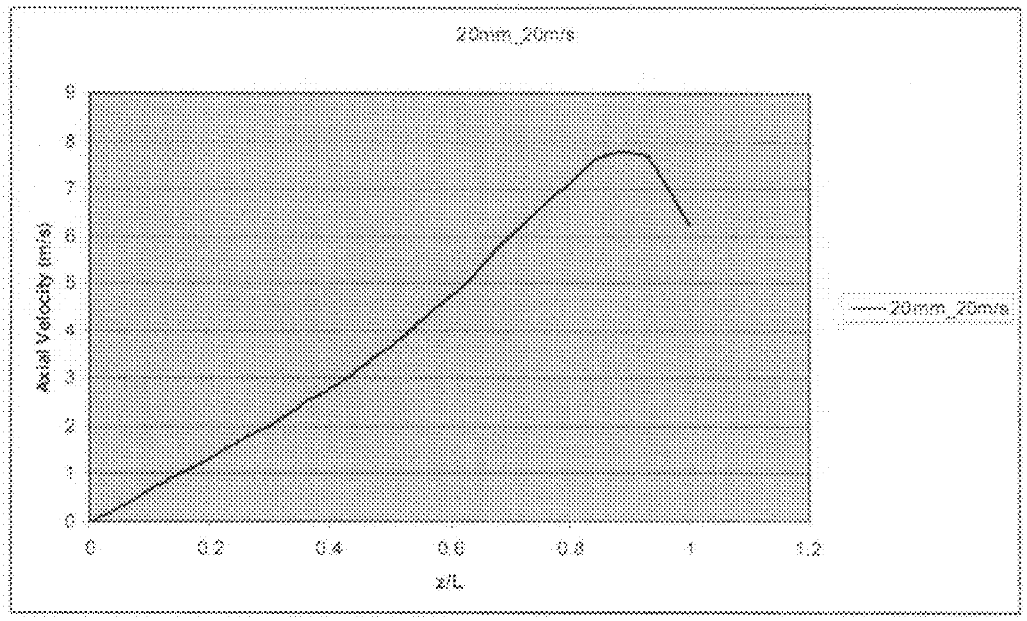
FIG. 20 illustrates the variation of axial velocity along z-axis of the device.
Figure 21:
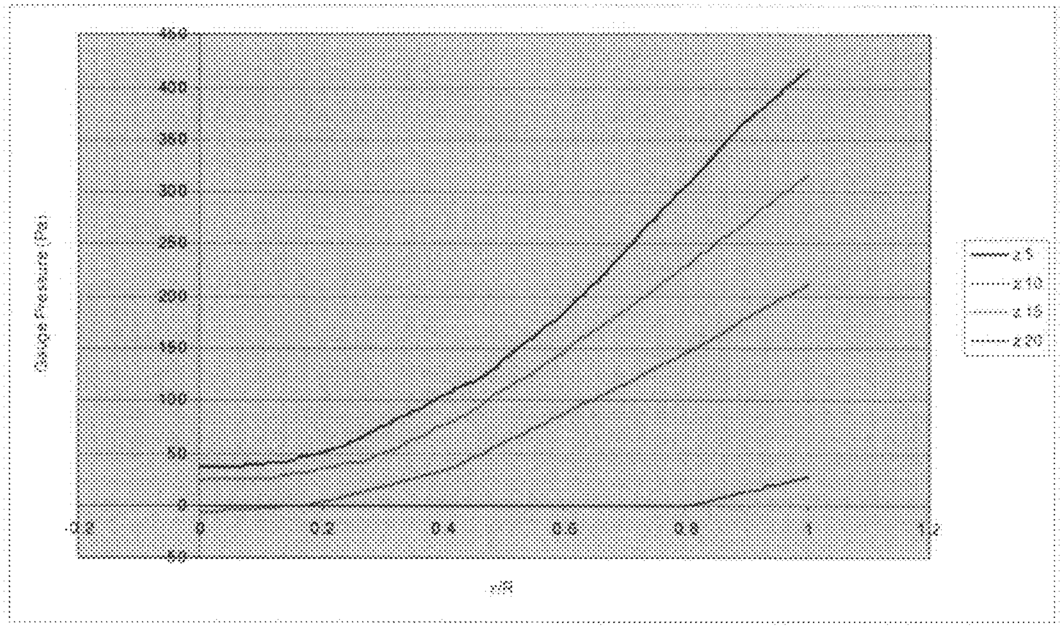
FIG. 21 illustrates the static pressure (gauge) as function of dimensionless radius at different cross-sections.
Figure 22:
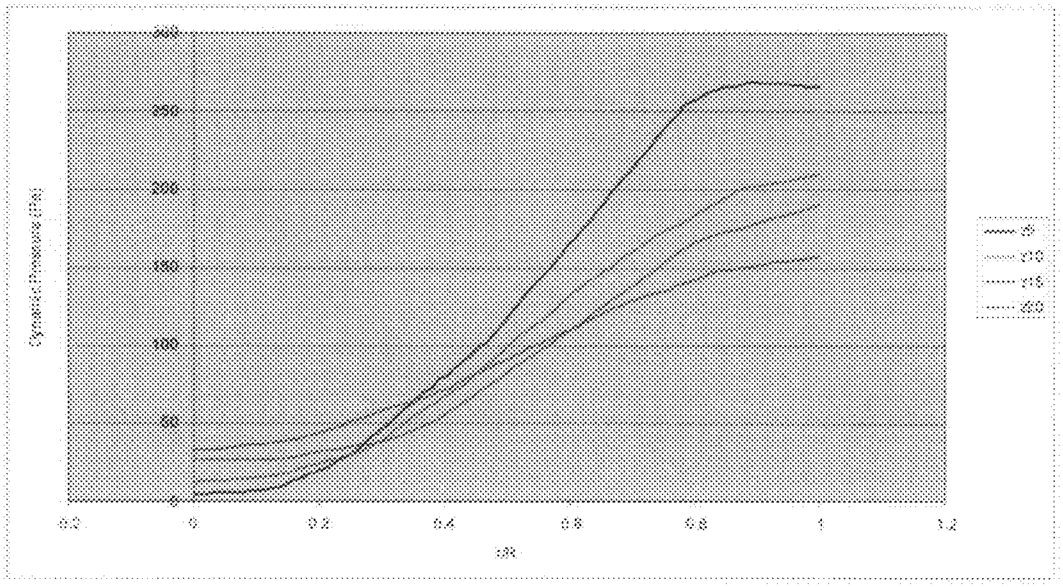
FIG. 22 illustrates the dynamic pressure as function of dimensionless radius at different cross-sections.

The axial velocity distributions as a function of the radius is shown in FIG. 19, along with variation of the axial velocity at the centerline as a function of distance from inlet to exit of the droplet/ion transmission interface. Clearly, the axial velocity remains fairy uniform across the entire cross-section (FIG. 19) and much smaller in magnitude than the maximum tangential flow velocity (FIG. 18). As clearly shown in FIG. 20, the axial flow first accelerates reaching its maximum, but eventually begins to dramatically decelerate (decreasing in magnitude) near the exit (z/L→1) of the device, thus showing the capability to provide a desired "slow-down" of ions carried with the flow prior to their introduction to the mass spectrometer. The static gauge (above atmospheric background) and dynamic pressure profiles (FIGS. 21 and 22) further verify the vortex motion being formed by the device, showing an increasing pressure along the radius which is indicative of vortex motion.

Effect of Operating Conditions and Geometry of the Device

Case 1 (Effect of the Pressure Inlet Boundary Condition at Air Intake)

Figure 23A:
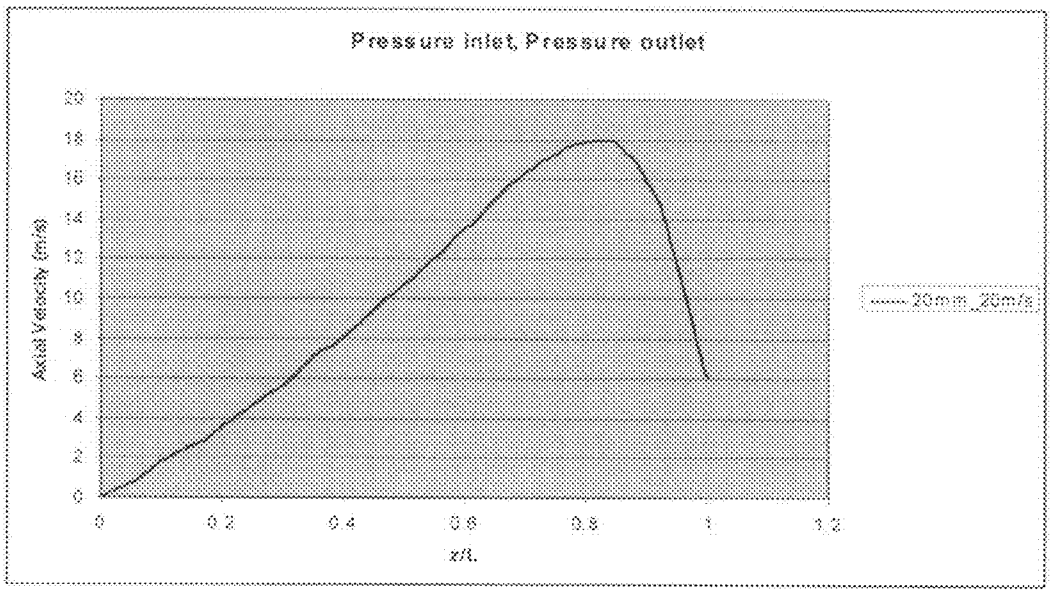
FIG. 23*a* illustrates the variation of axial velocity along z-axis of the device in the case of applied inlet pressure boundary condition.

A detailed analysis was carried out to capture the effect of different conditions (physical and geometrical) on the vortex flow enabled by the device. In particular, a scenario when inlet pressure is specified, rather than inlet velocity, has been investigated. The results of simulations with the inlet pressure of 1.1 bar and the outlet pressure 1.0 bar show similar trends to those observed in FIGS. 12-22. The only difference is that a desired "slow-down" of the flow was more dramatic near the exit, as exemplified in FIG. 23*a*.

Case 2 (Effect of the Device Length in Axial Direction)

Figure 23B:
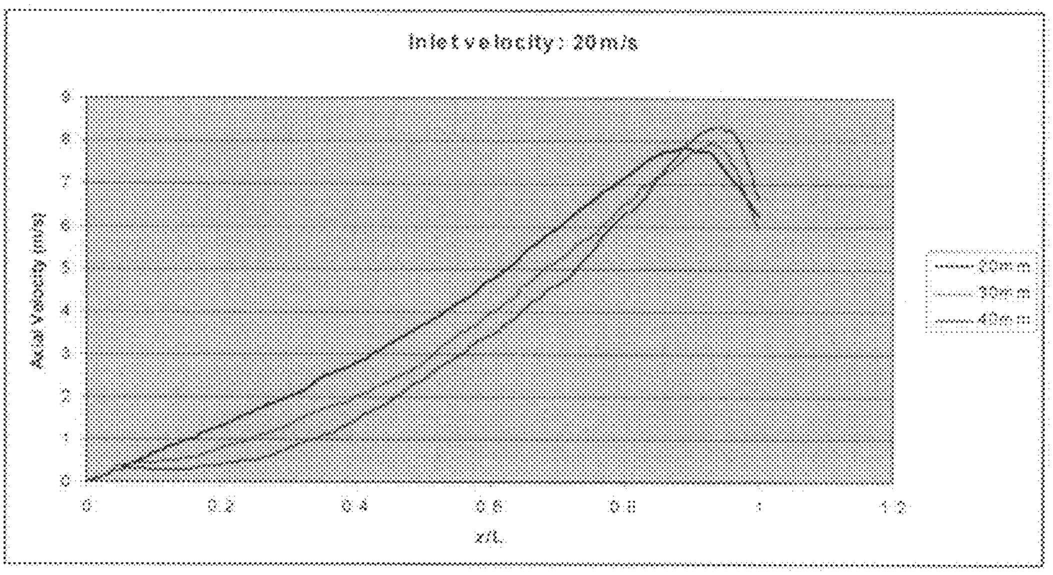
FIG. 23*b* illustrates the variation of axial velocity along z-axis of the device for different device lengths in axial direction.

Three device lengths of 20 mm, 30 mm and 40 mm were simulated. The specified inlet velocity boundary condition at air intake was used in the analysis. As clearly seen from FIG. 23*b*, in all three simulated cases the axial velocity shows similar variation trend along the length of the device. Since the outlet diameter and inlet velocity were same in all three cases, the outlet velocities for the three cases also came out to be very close to each other due to mass conservation and negligible frictional losses. Also, the vortex was clearly maintained till the end in all three cases. This suggests that the vortex flow structure has little dependence on the device length (for the baseline design considered here) and thus there is significant flexibility in choosing the device length based on the requirement of sufficient residence time for injected analyte/solvent droplets to ensure complete evaporation and de-solvation of ions.

Case 3 (Effect of the Air Velocity at Intake)

Figure 23C:
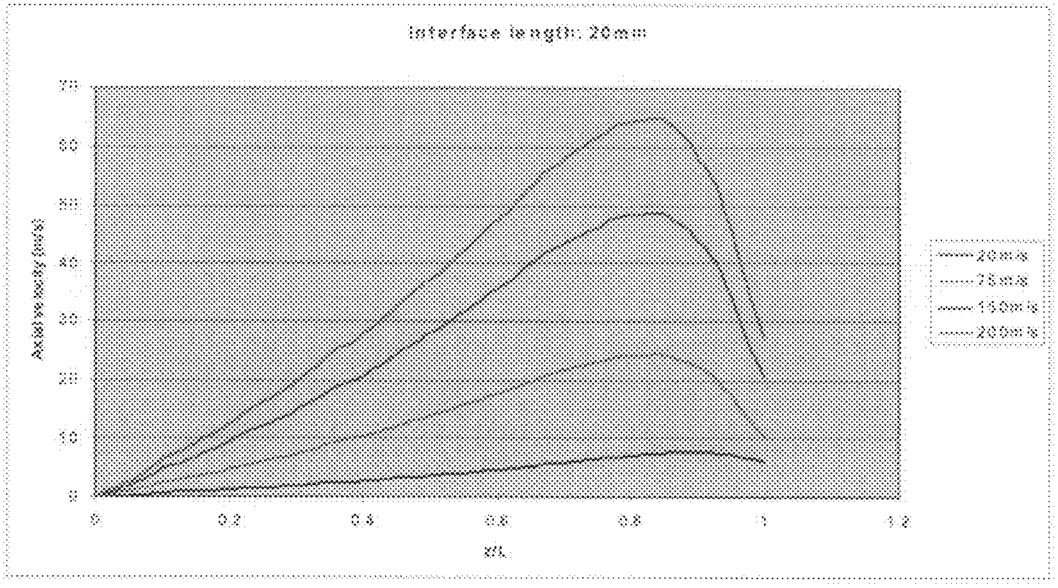
FIG. 23*c* illustrates the variation of axial velocity along z-axis of the device for different air intake velocities.

Further, the effect of air inlet velocity was considered for 20 mm-long device. Keeping all other parameters constant, four different air intake velocities of 20, 75, 150 and 200 m/s were considered. As seen in FIG. 23*c*, the velocity profile remains similar although the velocity magnitude increases proportionally with increase in inlet velocity. Thus, selection of air intake velocity should be based on the behavior of droplets (i.e., desired residence/evaporation time) and the optimal outlet velocity prior to ion introduction to the mass spectrometer.

Case 4 (Effect of the Outlet/Exit Diameter of the Device)

In order to study the effect of outlet/exit diameter, two devices were considered as described in Table 1. It should be noted that device #2 not only has smaller outlet diameter of 4 mm, but its length was also increased 26.7 mm to keep the angle of the cone the same as it is for device #1, thus ensuring a proper comparison of results.

TABLE 1

Geometry and operating parameters of devices with different outlet diameters

| Parameter/Boundary condition | Device 1 | Device 2 |
|---|---|---|
| Interface length | 20 mm | 26.7 mm |
| End A diameter | 20 mm | 20 mm |
| Outlet diameter | 8 mm | 4 mm |
| Inlet pipe diameter | 3 mm | 3 mm |
| Operating pressure | 1 atm | 1 atm |
| Outlet gauge pressure | 0 Pa | 0 Pa |
| Air intake velocity | 20 m/s | 20 m/s |

Figure 23D:
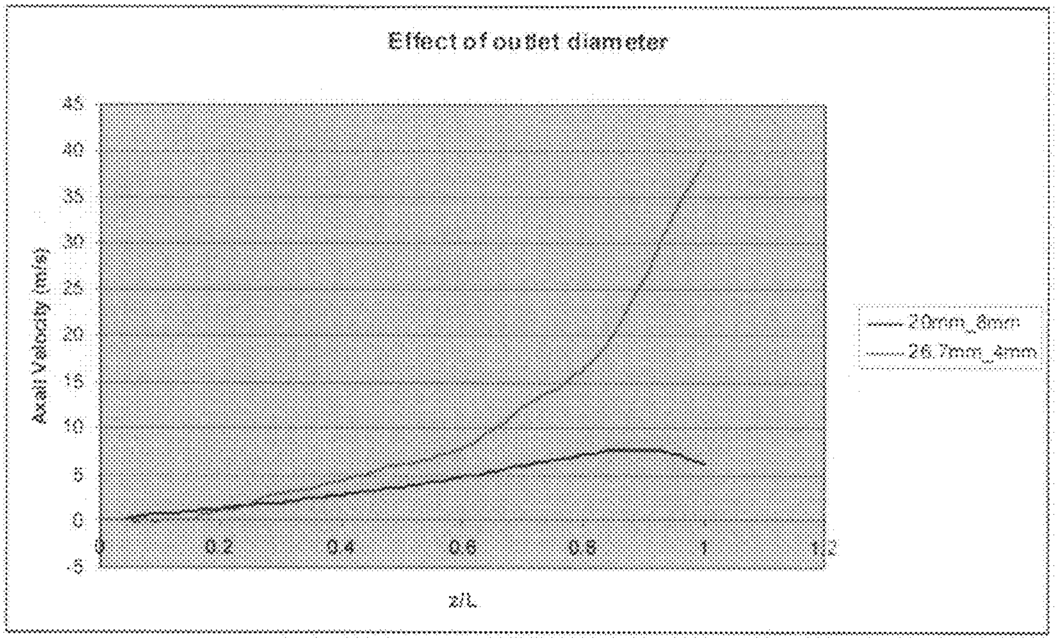
FIG. 23*d* illustrates the variation of axial velocity along z-axis of the device for different diameters of the device outlet.

FIG. 23*d* compares the axial velocities of the simulated device #1 and #2. As one would expect from mass conservation, the velocity of the stream leaving an interface with the smaller diameter outlet (device #1) is much greater than that in the case of baseline device #1 with larger outlet. However, what is interesting to note that flow of air remains always accelerating in the case of smaller outlet device #2, unlike the change from accelerating to decelerating (expansion) flow exhibited by the device #1. This suggests that the outlet velocity can be sensibly controlled by varying the outlet diameter of the droplet/ion transmission device.

Droplet Evaporation in the Vortex Flow

The CFD simulations for vortex flow in the device were augmented by adding a Discrete Phase Model capable to simulate transport and evaporation of analyte/solvent droplets by the droplet/ion transmission device. Methanol/water droplets typically used as a solvent for ionized mass spectrometric samples have been investigated. Different droplet sizes and injection positions have been analyzed and results are reported next.

Case 1 (Baseline)

Figure 24:
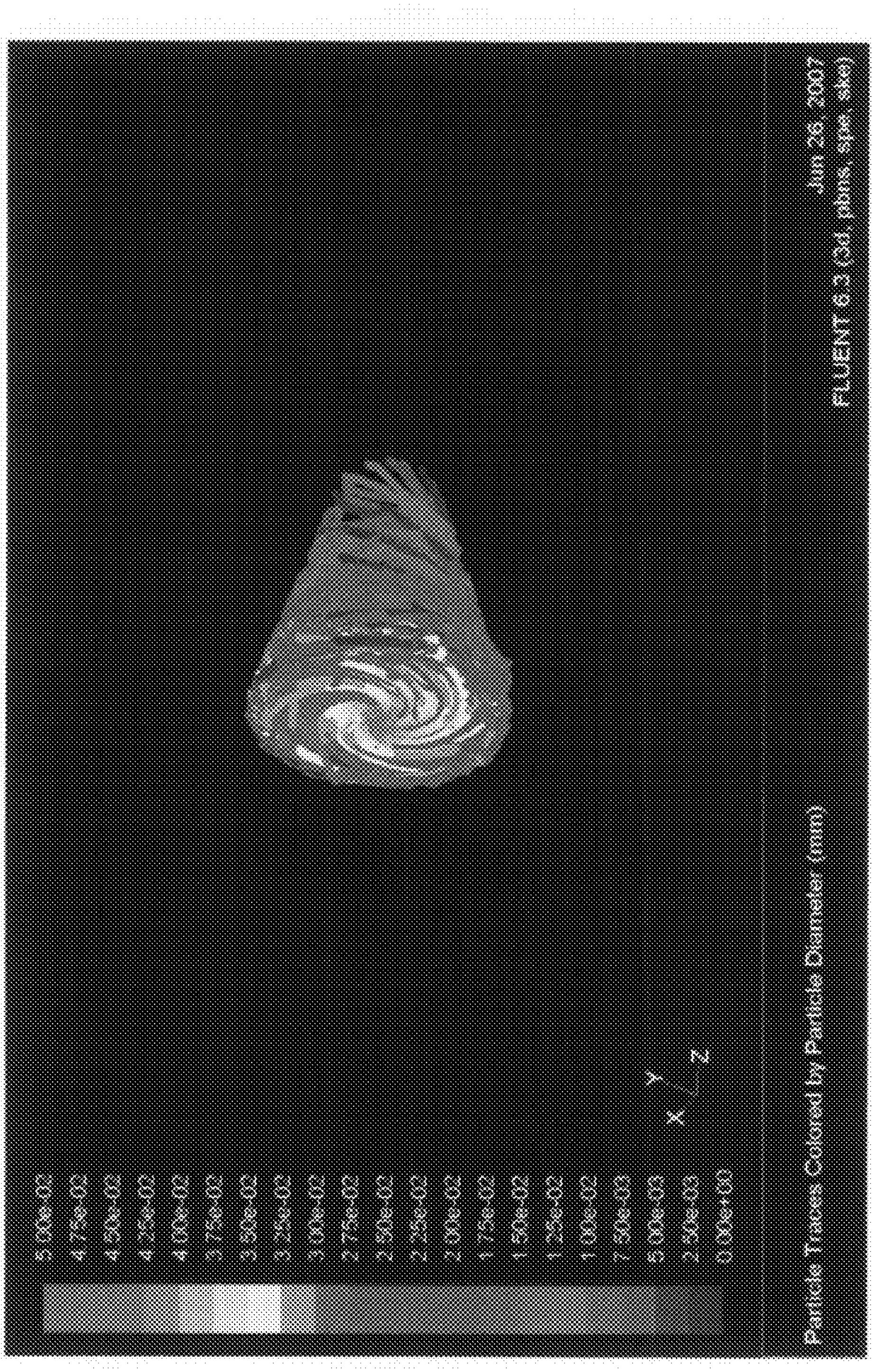
FIG. 24 illustrates the trajectories of water droplets and size (coded as color map) for simulation case 1 (baseline).

Number of injected droplet streams=1
Location of injection=centerline (axis r=0)
Temperature of droplets=300 K
Temperature of air=500 K
Velocity of air at intake=20 m/s
Droplet injection velocity=10 m/s
Droplet injection mass flow rate=1 e-6 kg/s
Droplet diameter=50 μm FIG. 24 clearly shows that droplets follow the converging/focusing/confining trajectories established by the vortex flow of the carrier gas (see FIGS. 12-15) and continuously evaporate (decrease in size from red-colored 50 μm at the inlet to vanishingly small blue-colored at the exit). This unambiguously proves the key disclosed capabilities of the device as a droplet/ion transmission interface, enabling simultaneous focusing of droplets and solvent evaporation (resulting in de-solvated ion formation).

Case 2 (Effect of Reduced Droplet Size and Multiple Ejected Droplet Streams)

Figure 25:
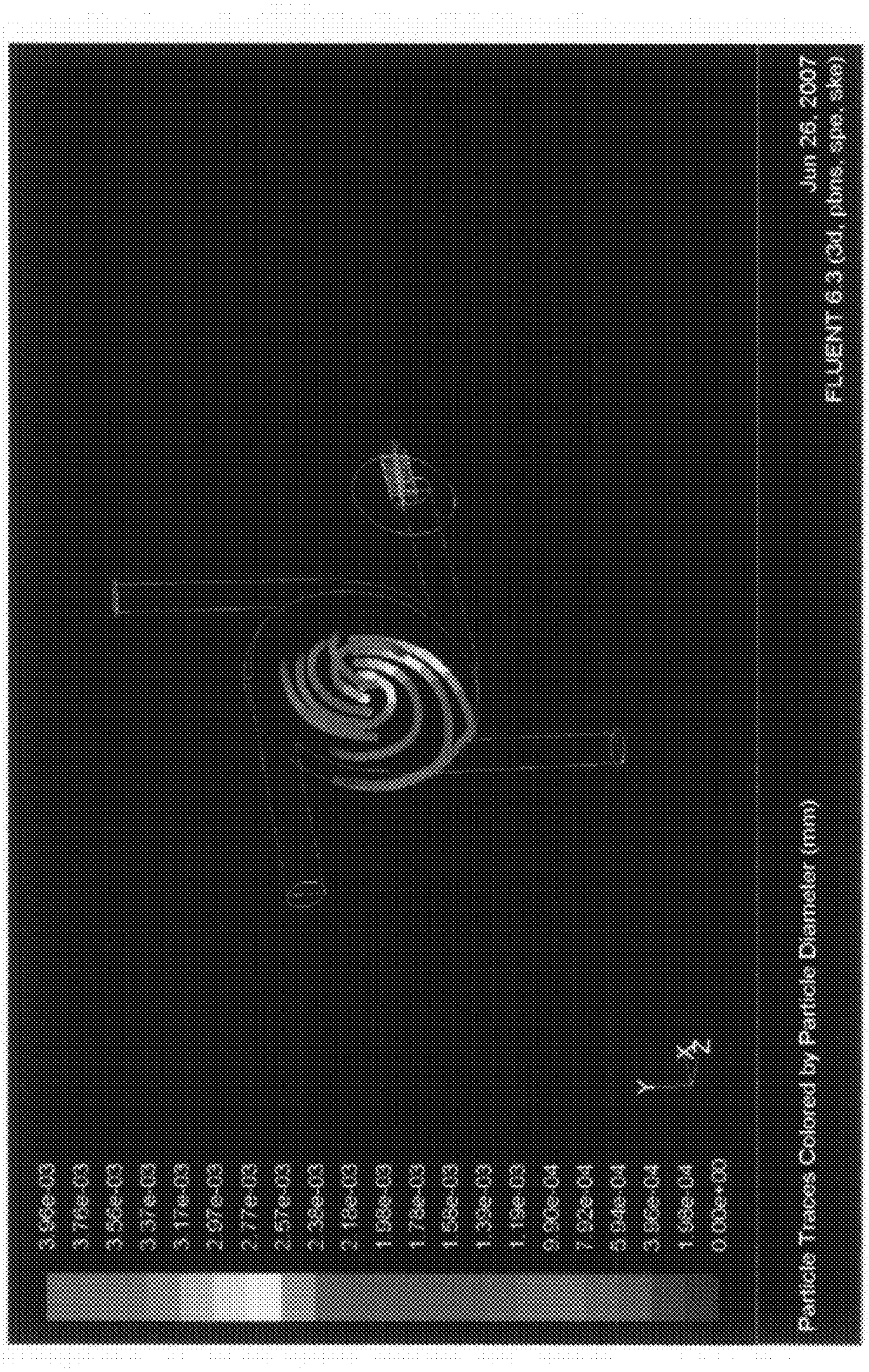
FIG. 25 illustrates the trajectories of water droplets and size (coded as color map) for simulation case 2 (smaller initial droplet size and multiple injection streams).

Number of injected droplet streams=10
Location of injection=equidistantly along the radius r at z=0
Temperature of droplets=300 K
Temperature of air=500 K
Velocity of air at intake=20 m/s
Droplet injection velocity=10 m/s
Droplet injection mass flow rate=1 e-6 kg/s
Droplet diameter=5 μm FIG. 25 indicates that droplets follow the converging vortex trajectories and evaporate very fast becoming vanishingly small (blue-colored in the figure) well before the stream even reaches the exit. This suggests that a fairly short interface or lower air intake velocity would be sufficient to achieve complete de-solvation of ions by the device.

Case 3 (Effect of Droplet Injection Location)

Figure 26:
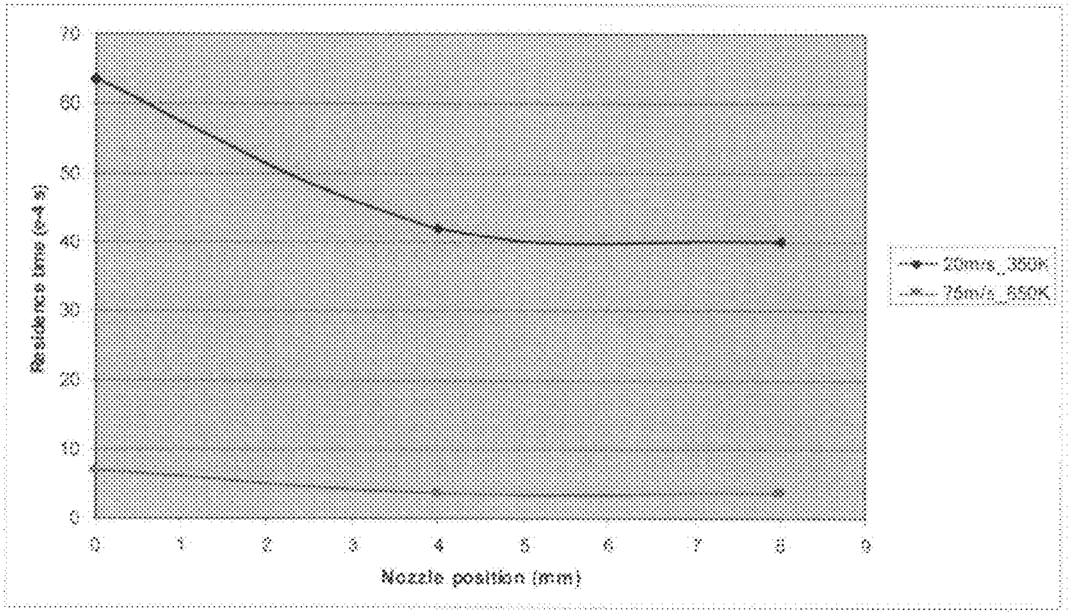
FIG. 26 illustrates the variation of droplet residence (evaporation) time with respect to injection location at the inlet of droplet/ion transmission device (simulations for 2 different sets of air velocity-temperature conditions).

In case 3 all simulation parameters are the same as those for the case 2 except varied air intake velocity (from 20 m/s to 75 m/s) and air temperature (from 350K to 650K). FIG. 26 shows the droplet residence time (i.e., the time it takes for droplet to completely evaporate) as function of the location of droplet injection point (#0 being at the centerline and #8 is near the cone wall). Clearly, the residence time decreases dramatically for the droplets injected further away from the centre, and the total time needed for droplet evaporation is also decreased dramatically with an increase in the air velocity and temperature. Thus, as expected, injected droplets evaporate faster if they are introduced into the stream further from the center because of the longer path they need to travel, and evaporation is enhanced by an increase in the temperature (due to increased saturation density) and velocity (due to higher mass transfer coefficient) of the vortex air stream.

Case 4 (Effect of Air Stream Velocity)

Figure 27:
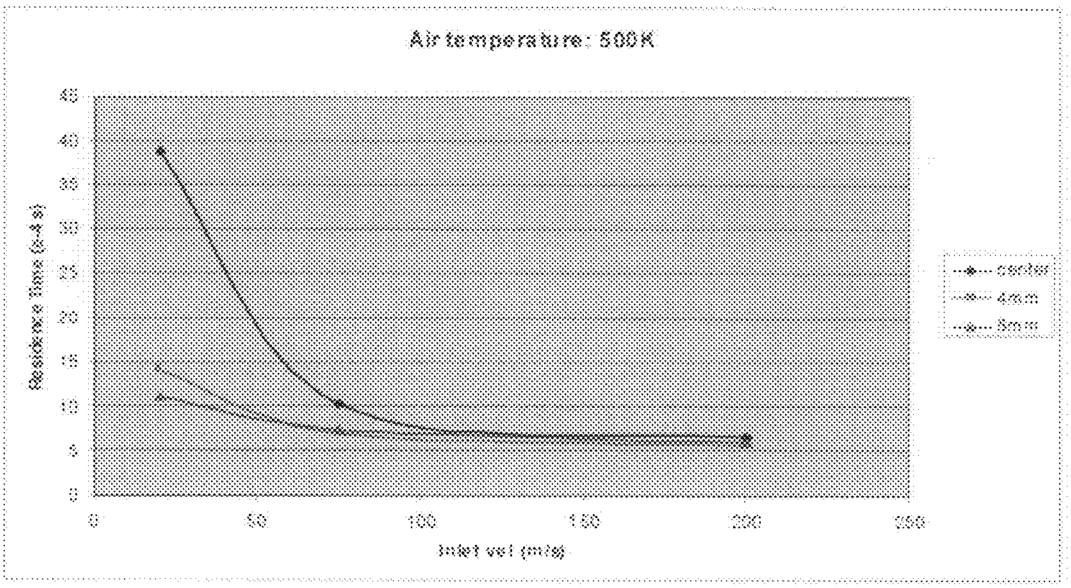
FIG. 27 illustrates the variation of droplet residence (evaporation) time with respect to air intake velocity (simulations for 3 different injection locations at the inlet of droplet/ion transmission device).

As shown in FIG. 27, the residence (evaporation) time decreases drastically with an increase in air velocity at intake due to enhanced evaporation (convective mass transfer augmentation) at higher vortex velocities. However, there appears to be a threshold value of ~80-90 m/s of the air intake velocity beyond which further increase in the velocity does not yield a significant improvement (decrease) in residence time. This specific value of the threshold velocity may not be universal and only applicable to a given device geometry and dimensions analyzed, but an existence of such a threshold value for the air velocity is of interest and has to be taken into account in designing any particular droplet/ion transmission interface.

Case 5 (Effect of Air Stream Temperature)

Figure 28:
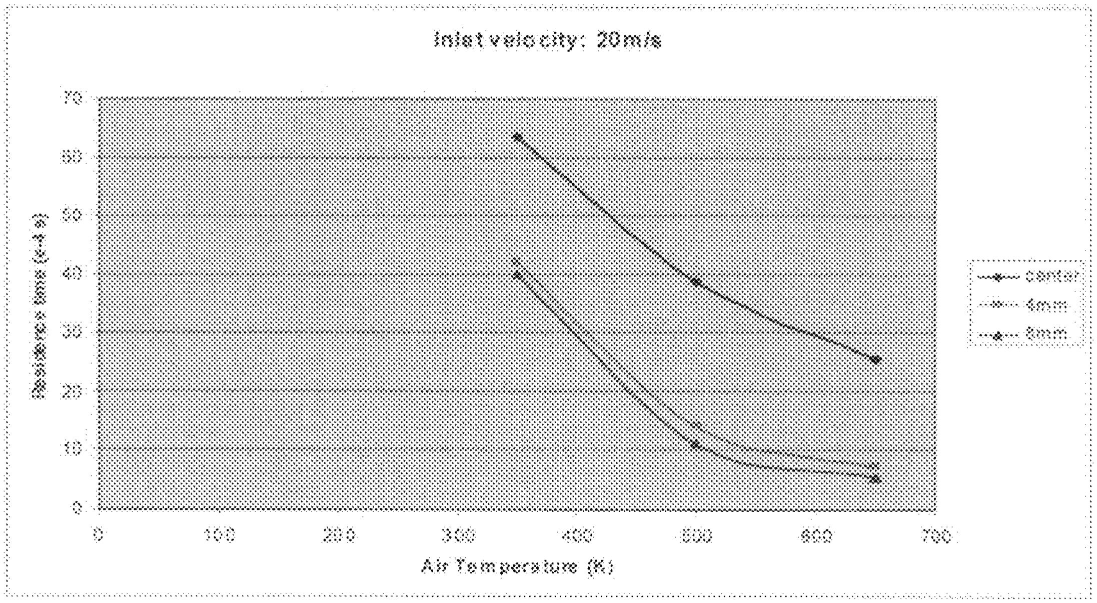
FIG. 28 illustrates the variation of droplet residence (evaporation) time with respect to air temperature (simulations for 3 different injection locations at the inlet of droplet/ion transmission device).

Simulations were carried out for three different air temperatures of 350K, 500K, and 650 K. As seen in FIG. 28, the residence (evaporation) time decreases strongly with increasing air temperature, clearly indicating faster evaporation due to enhanced heat transfer rates to the droplets as well as an increase in saturation density of the water/methanol mixture.

I claim:

1. A vortex flow transmission structure, comprising:

a cylindrical confining structure having a first end and a second end, wherein the cylindrical confining structure has an inlet at the first end, wherein the cylindrical confining structure has an outlet at the second end of the cylindrical confining structure along the center axis of the cylindrical confined structure, wherein the diameter of the first end is greater than the diameter of the second end, wherein the diameter of the cylindrical confining structure tapers from the first end of the cylindrical confining structure to the second end of the cylindrical confined structure, wherein at least one flow inlet is disposed at the first end of the cylindrical confined structure, wherein the flow inlet is adjacent the inlet at the first end and offset relative to the center axis of the cylindrical confined structure, and wherein the gas being flowed generates a vortex cyclotron flow from the first end of the cylindrical confining structure to the second end of the cylindrical confined structure.

2. The vortex flow transmission structure of claim 1, wherein the cylindrical confining structure has an internal surface selected from: the internal surface of the cylindrical confining structure is convex relative the center axis, the internal surface of the cylindrical confining structure is concave relative the center axis, the internal surface of the cylindrical confining structure is grooved to guide the vortex cyclotron flow, and combinations thereof.

3. The vortex flow transmission structure of claim 1, further comprising at least one electrode disposed adjacent the surface of the cylindrical confining structure with an applied electric potential producing an electric field to repel charged substances from the surface of the cylindrical confined structure.

4. The flow transmission structure of claim 1, further comprising at least one electrode in electronic communication with the surface of the cylindrical confining structure with an applied electric potential producing an electric field to repel charged substances from the surface of the cylindrical confined structure.

5. The vortex flow transmission structure of claim 1, further comprising:

a diverging section of the vortex flow transmission structure having a first end at the second end of the cylindrical confining structure and a second end, wherein the diameter of the first end of the diverging section is less than the diameter of the second end of the diverging section, wherein the diameter of the diverging section tapers from the second end of the diverging section to the first end of the diverging section; and an ion preservation structure disposed within the vortex flow transmission structure, wherein the ion preservation structure has the same center axis as the cylindrical confining structure, wherein the ion preservation structure has a first end and a second end, wherein the first end of the ion preservation structure is within or near the second end of the cylindrical confining structure, wherein the diameter of the first end of the ion preservation structure is less than the diameter of the second end of the cylindrical confining structure, wherein the diameter of the first end of the ion preservation structure and the diameter of the second end of the cylindrical confining structure are configured so that gas flows between the ion preservation structure and the cylindrical confining structure, wherein the ion preservation structure is configured so a portion of a plurality of substances flows into the first end of the ion preservation structure and out of the second end of the ion preservation structure.

6. The vortex flow transmission structure of claim 5, wherein the ion preservation structure is selected from a cylinder having a uniform diameter from the first end to the second end; a cylinder wherein the first end has a first diameter and the second end has a second diameter, wherein the first diameter is greater than the second diameter; and a cylinder wherein the first end has a first diameter and the second end has a second diameter, wherein the first diameter is less than the second diameter.

7. The vortex flow transmission structure of claim 5, wherein the ion preservation structure includes at least one electrode disposed adjacent the surface of the ion preservation structure with an applied electric potential producing an electric field to drive charged substances into the ion preservation structure.

8. The vortex flow transmission structure of claim 5, wherein the diverging section includes at least one electrode disposed adjacent the surface of the diverging section with an applied electric potential producing an electric field to repel charged substances from the surface of the diverging section.

9. The flow transmission structure of claim 5, further comprising:

a sampling orifice structure disposed at the second end of the diverging section, wherein the sampling orifice structure includes an orifice that substances flow through.

10. The vortex flow transmission structure of claim 9, wherein the sampling orifice structure includes an elongated perforated sampling capillary structure that is disposed within the cylindrical confining structure, wherein the elongated perforated sampling capillary structure includes an orifice that ions flow through, wherein the elongated perforated sampling capillary structure includes perforations along the length of the elongated perforated sampling capillary structure that ions enter.

11. The vortex flow transmission structure of claim 10, wherein the elongated perforated sampling capillary structure includes at least one electrode disposed adjacent the surface of the elongated perforated sampling capillary structure with an applied electric potential producing an electric field to drive charged substances into the sampling capillary.

12. The vortex flow transmission structure of claim 1, further comprising:

a sampling orifice structure disposed at the second end of the cylindrical confining structure, wherein the sampling orifice structure includes an orifice that substances flow through.

13. The vortex flow transmission structure of claim 12, wherein the sampling orifice structure includes an elongated perforated sampling capillary structure that is disposed within the cylindrical confining structure, wherein the elongated perforated sampling capillary structure includes an orifice that ions flow through, wherein the elongated perforated sampling capillary structure includes perforations along the length of the elongated perforated sampling capillary structure that ions enter.

14. The vortex flow transmission structure of claim 13, wherein the elongated perforated sampling capillary structure includes at least one electrode disposed adjacent the surface of the elongated perforated sampling capillary structure with an applied electric potential producing an electric field to drive charged substances into and within the sampling capillary.

15. The vortex flow transmission structure of claim 13, wherein the elongated perforated sampling capillary structure includes a plurality of perforations in the elongated perforated sampling capillary structure.

16. The vortex flow transmission structure of claim 1, further comprising an ion source disposed adjacent the inlet of the cylindrical confining structure, wherein the ion source is configured to generate charged substances that are entrained into the vortex cyclotron flow gas flow.

17. The vortex flow transmission structure of claim 1, further comprising a detection system disposed adjacent the outlet at the second end of the cylindrical confining structure to receive ions.

18. A mass spectrometry system, comprising:

a first ion source;

a first vortex flow transmission structure, comprising: a cylindrical confining structure having a first end and a second end, wherein the cylindrical confining structure has an inlet at the first end, wherein the cylindrical confining structure has an outlet at the second end of the cylindrical confining structure along the center axis of the cylindrical confined structure, wherein the diameter of the first end is greater than the diameter of the second end, wherein the diameter of the cylindrical confining structure tapers from the first end of the cylindrical confining structure to the second end of the cylindrical confined structure, wherein at least one flow inlet is disposed at the first end of the cylindrical confined structure, wherein the flow inlet is adjacent the inlet at the first end and offset relative to the center axis of the cylindrical confined structure, and wherein the gas being flowed generates a vortex cyclotron flow from the first end of the cylindrical confining structure to the second end of the cylindrical confined structure; and an ion detector system, wherein the first ion source is disposed adjacent the inlet of the first vortex flow transmission structure, and wherein the first vortex flow transmission structure is adjacent the ion detector system.

19. The mass spectrometry system of claim 18, further comprising:

a diverging section of the first vortex flow transmission structure having a first end at the second end of the cylindrical confining structure and a second end, wherein the diameter of the first end of the diverging section is less than the diameter of the second end of the diverging section, wherein the diameter of the diverging section tapers from the second end of the diverging section to the first end of the diverging section; and an ion preservation structure disposed within the first vortex flow transmission structure, wherein the ion preservation structure has the same center axis as the cylindrical confining structure, wherein the ion preservation structure has a first end and a second end, wherein the first end of the ion preservation structure is within or near the second end of the cylindrical confining structure, wherein the diameter of the first end of the ion preservation structure is less than the diameter of the second end of the cylindrical confining structure, wherein the diameter of the first end of the ion preservation structure and the diameter of the second end of the cylindrical confining structure are configured so that gas flows between the ion preservation structure and the cylindrical confining structure, wherein the ion preservation structure is configured so a portion of a plurality of substances flows into the first end of the ion preservation structure and out of the second end of the ion preservation structure.

20. The mass spectrometry system of claim 19, further comprising:

a sampling orifice structure disposed at the second end of the diverging section, wherein the sampling orifice structure includes an orifice that substances flow through.

21. The mass spectrometry system of claim 20, wherein the sampling orifice structure includes an elongated perforated sampling capillary structure that is disposed within the cylindrical confining structure, wherein the elongated perforated sampling capillary structure includes an orifice that ions flow through, wherein the elongated perforated sampling capillary structure includes perforations along the length of the elongated perforated sampling capillary structure that ions enter.

22. The mass spectrometry system of claim 18, further comprising:

a sampling orifice structure disposed at the second end of the cylindrical confining structure, wherein the sampling orifice structure includes an orifice that substances flow through.

23. The mass spectrometry system of claim 22, wherein the sampling orifice structure includes an elongated perforated sampling capillary structure that is disposed within the cylindrical confining structure, wherein the elongated perforated sampling capillary structure includes an orifice that ions flow through, wherein the elongated perforated sampling capillary structure includes perforations along the length of the elongated perforated sampling capillary structure that ions enter.

24. The mass spectrometry system of claim 18, further comprising:

a second ion source; and a second vortex flow transmission structure, comprising: a cylindrical confining structure having a first end and a second end, wherein the cylindrical confining structure has an inlet at the first end, wherein the cylindrical confining structure has an outlet at the second end of the cylindrical confining structure along the center axis of the cylindrical confined structure, wherein the diameter of the first end is greater than the diameter of the second end, wherein the diameter of the cylindrical confining structure tapers from the first end of the cylindrical confining structure to the second end of the cylindrical confined structure, wherein at least one flow inlet is disposed at the first end of the cylindrical confined structure, wherein the flow inlet is adjacent the inlet at the first end and offset relative to the center axis of the cylindrical confined structure, and wherein the gas being flowed generates a vortex cyclotron flow from the first end of the cylindrical confining structure to the second end of the cylindrical confined structure, wherein the second ion source is disposed adjacent the inlet of the second vortex flow transmission structure, and wherein the second vortex flow transmission structure is adjacent the ion detector system.

* * * * *

UNITED STATES PATENT AND TRADEMARK OFFICE

CERTIFICATE OF CORRECTION

PATENT NO. : 7,595,487 B2
APPLICATION NO. : 11/895532
DATED : September 29, 2009
INVENTOR(S) : Fedorov It is certified that error appears in the above-identified patent and that said Letters Patent is hereby corrected as shown below:

IN THE SPECIFICATIONS:

Column 1, line 7, please insert the following paragraph:

--STATEMENT REGARDING FEDERALLY SPONSORED RESEARCH OR DEVELOPMENT

This invention was made with Government support under Agreement 1 R21 RR021474-01A1, awarded by the national Institutes of Health. The Government has certain rights to this invention.--

Signed and Sealed this

Fourteenth Day of December, 2010

David J. Kappos
*Director of the United States Patent and Trademark Office*